United States Patent
Kondo

(12) 
(10) Patent No.: US 6,192,076 B1
(45) Date of Patent: Feb. 20, 2001

(54) IMAGE CODING AND DECODING USING MAPPING COEFFICIENTS CORRESPONDING TO CLASS INFORMATION OF PIXEL BLOCKS

(75) Inventor: Tetsujiro Kondo, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 08/893,134

(22) Filed: Jul. 15, 1997

(30) Foreign Application Priority Data

Jul. 17, 1996 (JP) .................................................. 8-206553

(51) Int. Cl.[7] .................................................. H04N 7/12
(52) U.S. Cl. ................. 375/240.12; 375/240.21; 375/240.24
(58) Field of Search .................... 348/384, 390, 348/400–402, 407, 409–413, 415, 420, 421, 448, 590; 382/232, 233, 236, 238, 300; 375/240, 240.01, 240.12, 240.14, 240.21, 240.22, 240.24, 240.25; H04N 7/12

(56) References Cited

U.S. PATENT DOCUMENTS

| | | | |
|---|---|---|---|
| 4,703,352 | 10/1987 | Kondo | 358/135 |
| 4,845,559 | * 7/1989 | Labit et al. | 375/240.22 |
| 5,020,120 | 5/1991 | Weldy | 382/56 |
| 5,122,873 | 6/1992 | Golin | 358/133 |
| 5,193,003 | 3/1993 | Kondo | 358/136 |

(List continued on next page.)

FOREIGN PATENT DOCUMENTS

| | | | |
|---|---|---|---|
| 0 276 603 A1 | 8/1988 | (EP) | H04N/7/13 |
| 0293041 A1 | 11/1988 | (EP) | H04N/7/13 |
| 0 546 845 A2 | 6/1993 | (EP) | H04N/7/01 |
| 0 571 180 A2 | 11/1993 | (EP) | H04N/7/137 |
| 0635978 A1 | 1/1995 | (EP) | H04N/7/01 |
| 3-53778 | 3/1991 | (JP) | H04N/7/13 |
| WO 91/20159 | 12/1991 | (WO) | H04N/7/13 |
| WO 92/07445 | 4/1992 | (WO) | H04N/7/13 |
| WO 93/13624 | 7/1993 | (WO) | H04N/7/13 |

OTHER PUBLICATIONS

B. Ramamurthi & A. Gersho, "Classified Vector Quantization of Images," IEEE Transactions on Communications, vol. COM–34, No. 11, Nov. 1986, pp. 1105–1115.

Patent Abstracts of Japan, JP 07147681, "Hierarchial Coding/Decoding Device for Digital Image Signal," (Sony Corporation), Jun. 6, 1995.

I. Chang et al., "Adaptive Subsampling JPEG Image Coding," IEEE, Jun. 1995, pp. 264–265.

Patent Abstracts of Japan, JP 7–147681, Published Jun. 6, 1995, Sony Corporation.

Patent Abstracts of Japan, vol. 017, No. 331 (E–1386), Jun. 23 1993 (Jun. 23, 1993) & JP 05 037916 A (Mitsubishi Electric Corp), Feb. 12, 1993 (Feb. 12 1193) *Abstract*.

*Primary Examiner*—Richard Lee
(74) *Attorney, Agent, or Firm*—Limbach & Limbach L.L.P.

(57) ABSTRACT

An apparatus and method provides is configured such that a decoded image can be provided that is almost identical to the original image being encoded. In particular, corrected data of fewer pixels than the number of pixels for an original image is calculated by carrying out prescribed calculations using a pixel value for pixels of each block of the image and mapping coefficients that correspond to the class of the block. A predicted value for the original image is then estimated at a local decoder based on the corrected data. Then, at an error calculator, a prediction error for the original image for the predicted value is detected. At a mapping setting unit, a mapping coefficient corresponding to the class of the block is changed based on this prediction error. By repeating this process, mapping coefficients occurring when the prediction error is less than a prescribed threshold value are obtained. The number of pixels in the encoded image is thus minimized by including mapping coefficient in place of at least some of the image information.

69 Claims, 18 Drawing Sheets

U.S. PATENT DOCUMENTS

| | | | |
|---|---|---|---|
| 5,200,962 | 4/1993 | Kao et al. | 371/41 |
| 5,289,549 | 2/1994 | Rattey et al. | 382/56 |
| 5,293,230 | 3/1994 | Golin | 348/410 |
| 5,331,414 | 7/1994 | Golin | 348/390 |
| 5,349,385 | 9/1994 | Glenn | 348/458 |
| 5,384,869 | 1/1995 | Wilkinson et al. | 382/56 |
| 5,469,216 * | 11/1995 | Takahashi et al. | 348/421 |
| 5,487,119 | 1/1996 | Kimura et al. | 382/239 |
| 5,495,297 * | 2/1996 | Fujimori et al. | 348/590 |
| 5,504,535 | 4/1996 | Abe | 348/565 |
| 5,517,245 | 5/1996 | Kondo et al. | 348/392 |
| 5,517,588 * | 5/1996 | Kondo | 382/300 |
| 5,553,160 | 9/1996 | Dawson | 382/166 |
| 5,598,214 | 1/1997 | Kondo et al. | 348/414 |
| 5,610,658 | 3/1997 | Uchida et al. | 348/416 |
| 5,625,712 | 4/1997 | Schoenzeit et al. | 382/232 |
| 5,663,764 * | 9/1997 | Kondo et al. | 348/421 |
| 5,666,164 * | 9/1997 | Kondo et al. | 348/421 |
| 5,680,225 | 10/1997 | Hirabayashi et al. | 358/451 |
| 5,687,257 | 11/1997 | Paik et al. | 382/239 |
| 5,734,433 * | 3/1998 | Kondo et al. | 348/421 |
| 5,739,873 * | 4/1998 | Kondo | 348/448 |
| 5,754,702 | 5/1998 | Simpson | 382/240 |
| 5,796,442 | 8/1998 | Gove et al. | 348/556 |
| 5,812,699 | 9/1998 | Zhu et al. | 382/232 |
| 5,859,667 * | 1/1999 | Kondo et al. | 375/240.14 |
| 5,867,593 | 2/1999 | Fukuda et al. | 382/176 |
| 5,870,434 | 2/1999 | Kondo et al. | 375/242 |
| 5,880,784 | 3/1999 | Lillevold | 348/404 |
| 5,912,708 | 6/1999 | Kondo et al. | 348/415 |
| 5,930,394 | 6/1999 | Kondo et al. | 382/232 |
| 5,960,116 | 9/1999 | Kajiwara | 382/238 |
| 5,966,179 | 10/1999 | Kondo et al. | 348/408 |
| 5,969,764 | 10/1999 | Sun et al. | 348/404 |
| 6,016,164 * | 1/2000 | Kawaguchi et al. | 348/420 |

* cited by examiner

IMAGE CODING AND DECODING USING MAPPING COEFFICIENTS CORRESPONDING TO CLASS INFORMATION OF PIXEL BLOCKS

BACKGROUND OF THE INVENTION

1. Field of the Invention

The present invention relates to an image coding apparatus and image coding method, image decoding apparatus, recording medium and image processing apparatus and image transmitting method, and more particularly relates to the image coding apparatus and image coding method, image decoding apparatus, recording medium and image processing apparatus and image transmitting method capable of thinning-out (subsampling) and compression encoding an image in such a manner that a decoded image is almost identical to a source image.

2. Description of the Related Art

Conventionally, various methods have been proposed as methods for compressing images, with one of these methods being a method of compressing an image by thinning-out the number of pixels of the image.

However, when an image compressed by this kind of thinning-out is simply expanded by interpolation, the resolution of the resulting decoded image is poor.

There are at least two reasons for this kind of deterioration in the resolution of the decoded image. One reason is that high frequency components included in the original image are not included in the thinned-out image. A second reason is that the pixel values of pixels comprising the image after thinning-out are not particularly suitable for decoding the original image. Accordingly, it would be desirable to provide methods and apparatus which resolves these problems.

SUMMARY OF THE INVENTION

As the present invention sets out to resolve these problems, the present invention is to encode images by thinning-out (sub-sampling) in such a manner that a decoded image is obtained that is identical (or, at least, almost identical) to the original image data.

An image encoding method and apparatus in accordance with the invention generates class information corresponding to blocks of pixels of original image data. Using the class information, mapping coefficients that correspond to the class information are read out of a memory. The coded image data is produced responsive to the original image data and the read mapping coefficients.

An image decoding method and apparatus in accordance with the invention receives the coded image data and extracts blocks of pixels. Class information is generated corresponding to the extracted blocks of pixels. Predicted coefficients corresponding to the generated class information are read from a memory. Decoded image data is produced responsive to the coded image data and the read predicted coefficients.

These and other aspects of the invention will become apparent when considered with reference to the following description and the accompanying drawings.

DETAILED DESCRIPTION

In order to clarify the corresponding relationship between each of the means of the various embodiments described herein, certain characteristics of the present invention are first briefly described with reference to the Figures. It is to be understood that the term "unit" is to be interpreted in its broadest sense, including a hard-wired circuit, a main frame computer loaded with appropriate software, a programmed microprocessor or microcontroller, or a combination of these.

The image coding apparatus of the present invention includes blocking means (for example, the blocking unit 11 etc. shown in FIG. 2) for blocking an image into prescribed blocks (for class classifying); a classifying means (for example, the class classifying unit 13 shown in FIG. 2) for classifying the blocks into prescribed classes in response to characteristics of the blocks; storing means (for example, the mapping coefficients memory 14 shown in FIG. 2) for storing a prescribed mapping coefficient each block; and calculating means (for example, the calculating unit 16 shown in FIG. 2) for calculating coded data where a number of pixels for a coded image is fewer. In particular, the calculating means performs prescribed calculations on a pixel value for pixels of a block and one or more mapping coefficients corresponding to a class of blocks to which the block belongs.

The foregoing is not intended to be limited to each of the above-listed means.

Figure 1:
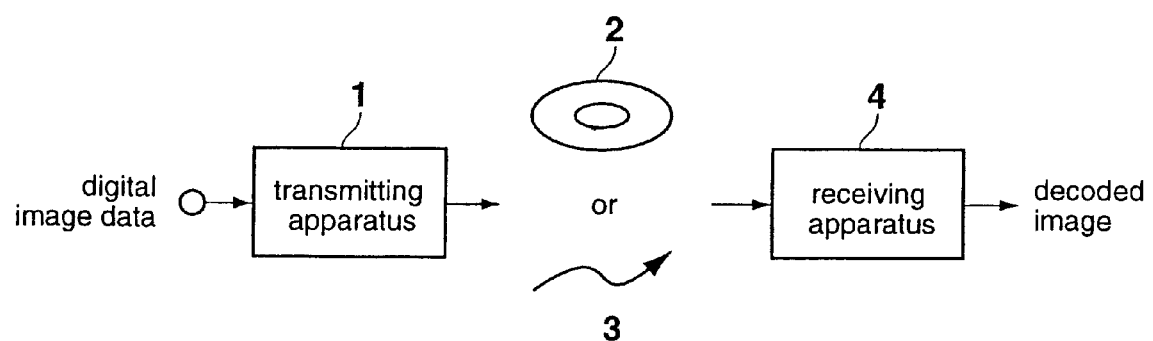
FIG. 1 is a block view showing the configuration of an embodiment of the present invention applied to an image processing system.

Referring now to FIG. 1, an image processing system is shown. In operation, digitized image data is supplied to a transmitting apparatus 1. The transmitting apparatus 1 subjects the input image data to prescribed arithmetic processing and records the resulting data onto a recording medium 2 comprising, for example, an optical disc, magneto-optical disc or magnetic tape, etc., or transmits the resulting data via a transmission path 3 of, for example, ground waves, broadcast circuits, telephone lines or CATV networks etc.

Coded data recorded on the recording medium 2 is then played back at a receiving apparatus 4 or coded data transmitted via the transmission path 3 is received. This coded data is then expanded and decoded, with the resulting decoded image being supplied to a display not shown in the drawings.

The image processing system described above can be applied to, for example, apparatus for recording/reproducing images such as optical disc apparatus, magneto-optical disc apparatus, magnetic tape apparatus etc., and apparatus for carrying out transmission of images such as, for example, video phone apparatus, television broadcast systems and CATV systems, etc. Further, the image processing system of FIG. 1 can also be applied to portable terminals that can be utilized on the move and that are of a low transmission rate such as, for example, portable telephones, etc.

Figure 2:
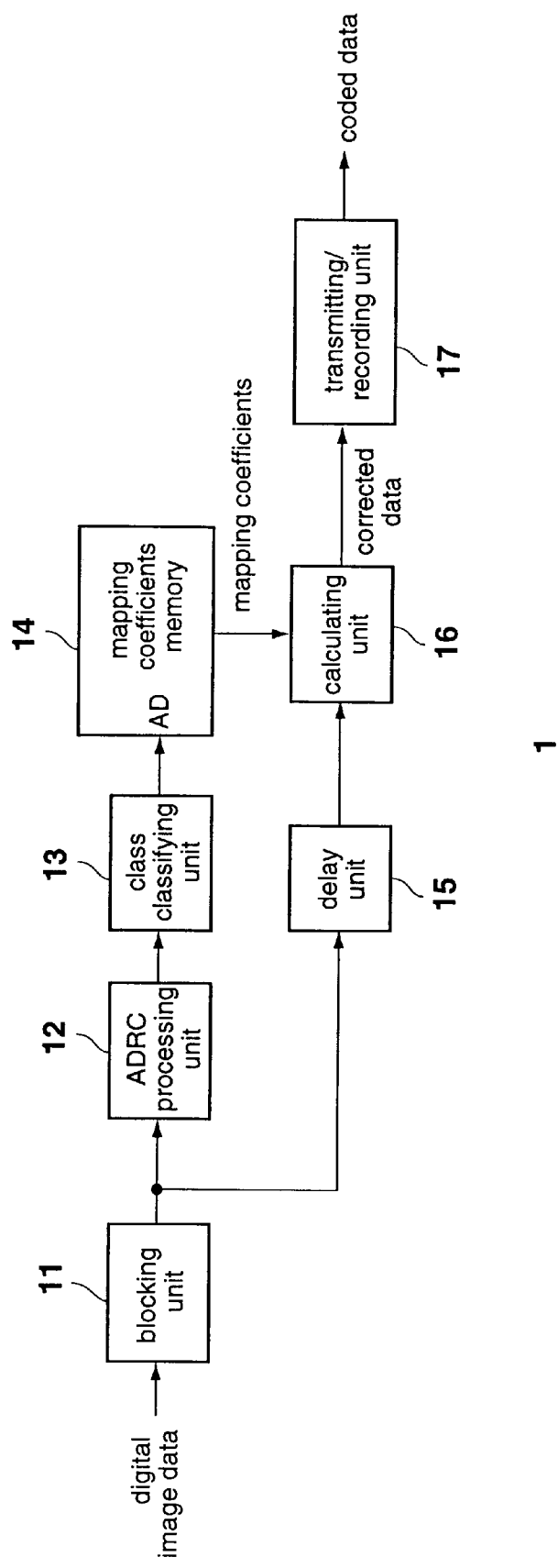
FIG. 2 is a block view showing an example configuration of the transmission device 1 of FIG. 1.

Referring to FIG. 2, image data to be coded is inputted to a blocking unit 11. The blocking unit 11 then divides the image up into blocks (e.g., each block may be a 3×3 pixel block) centered about a noted pixel. The blocks are then supplied to an ADRC (Adaptive Dynamic Range Coding) processing unit 12 and to a delay unit 15.

The ADRC processing unit 12 then performs ADRC processing on the blocks provided from the blocking unit 11 and outputs the resulting ADRC code to a class classifying unit 13.

The number of bits needed to represent pixels of the blocks is thus reduced according to the ADRC processing.

Figure 3A:
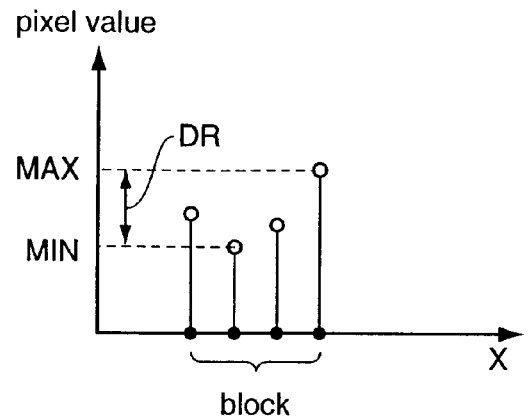
FIGS. 3A, 3B and 3C are views illustrating an ADRC process.

An example is now discussed using, for simplicity, a block that has only four pixels. Referring to FIG. 3A, the maximum value MAX and the minimum value MIN for the four pixels is detected in the ADRC processing. DR=MAX−MIN is then taken as the localized dynamic range of the block and the pixel values of the pixels comprising this block are quantized to K-bits based on this dynamic range DR.

Figure 3B:
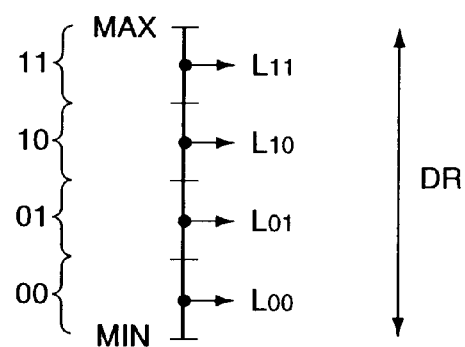

That is, the minimum value MIN is subtracted from the values of each of the pixels within the block and the result of this subtraction is divided by $DR/2^K$ and converted to a code corresponding to the resultant divided value. For example, when K=2 as shown in FIG. 3B, the dynamic range DR is divided into four ($=2^2$) equal parts and a determination is made as to which part of the range each pixel value belongs. When the divided value belongs to the range of the lowermost level, the range of the second lowermost level, the range of the third lowermost level or the range of the uppermost level, coding is carried out into two bits of, for example, 00B, 01B, 10B or 11B, respectively (B indicates a binary number). Decoding is then carried out on the decoding side by converting the ADRC code 00B, 01B, 10B and 11B to the center value L00 of the range for the lowermost level, the center value L01 for the range for the second lowermost level, the center value L10 for the range for the third lowermost level and the center value L11 for the range for the uppermost level. The minimum value MIN is then added to this value.

Figure 3C:
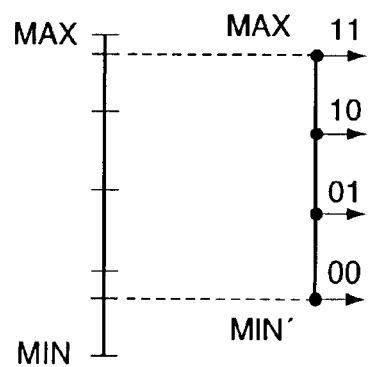

The kind of ADRC illustrated in FIG. 3B is referred to as non-edge matching. FIG. 3C illustrates an improved ADRC processing. As shown in FIG. 3C, the dynamic range DR is divided into four equal parts and the mean value MIN' for the pixel value belonging to the range of the lowermost level and the mean value MAX' for the pixel value belonging to the range of the uppermost level are converted to ADRC codes 00B and 11B. The levels dividing the dynamic range DR' (into three equal parts) defined by MAX'−MIN' are converted to ADRC codes 01B and 10B so that ADRC decoding is carried out.

The details of ADRC processing are disclosed in detail in, for example, Japanese Laid-open Patent Publication Hei. 3-53778.

The bit number is thus reduced by performing ADRC processing so that re-quantization can be performed using a smaller number of bits than the number of bits allotted to the pixels comprising the original blocks.

Returning again to FIG. 2, the class classifying unit 13 performs class classifying processing to classify blocks from the ADRC processing unit 12 in response to the characteristics of these blocks. Information as to which class a block belongs is provided to the mapping coefficients memory 14 as class information.

Figure 4A:
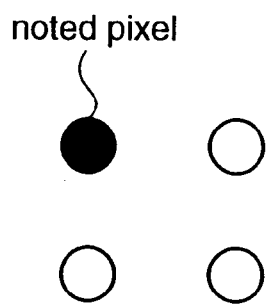
FIGS. 4A and 4B are views illustrating a class classifying process.
Figure 4B:
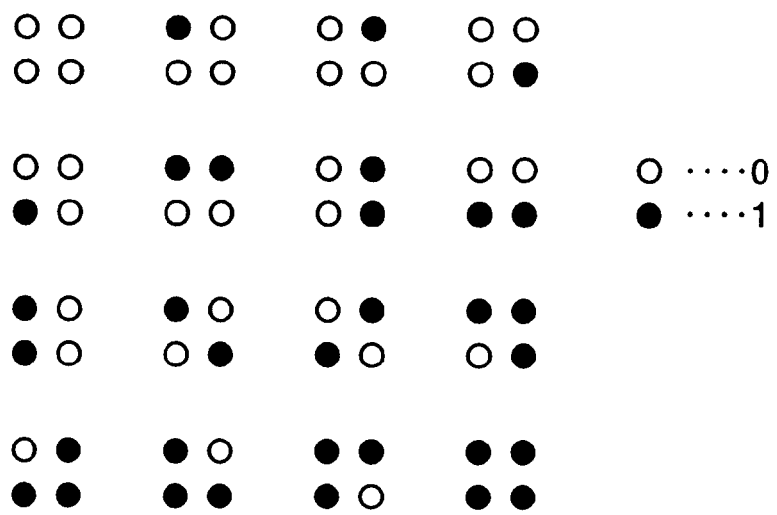

Details of the class classifying processing is now described with reference to an example. As shown in FIG. 4A, a "noted" pixel and the neighboring three pixels comprise a 2×2 pixel block (class classifying block), with each of the pixels of the block being expressed by one bit (a level of either 0 or 1). In this case, these 2×2 pixel blocks are classified into 16 ($=(2^1)^4$) patterns as shown in FIG. 4B using the level distribution of each of the pixels. This pattern dividing is one example of class classifying processing that may be carried out by the class classifying unit 13.

Class classifying processing may also be carried out so as to give more consideration to the activity (image complexity) of the image (image within a block).

For example, when 8 bits are allotted to the image data to be coded so that the block for class classifying comprises 9 pixels arranged as 3×3 and class classifying processing is then carried out taking a block for class classifying as an object, a large number of class classifying patterns $(2^8)^9$ may result.

Thus, at the ADRC processing unit 12, ADRC processing is carried out on the blocks for class classifying so that both the number of bits representing the pixels comprising the blocks for class classifying and also the number of classes can be reduced, i.e. the number of classes can be reduced from $(2^8)^9$ to $(2^1)^9$, i.e. reduced to 512 when, for example, one bit ADRC processing is carried out at the ADRC processing unit 12.

In the thus-described embodiment, class classifying processing is carried out at the class classifying unit 13 based on the ADRC codes output from the ADRC processing unit 12. However, class classifying processing can also be carried out using data upon which, for example, DPCM (estimation coding) BTC (Block Truncation Coding), VQ (vector quantization), DCT (Discrete Cosine Transforms) or Adamar transforms or other transforms has been performed.

Referring again to FIG. 2, the mapping coefficients memory 14 stores mapping coefficients obtained by a learning process (mapping coefficient learning) for each item of class information. The learning process is described later in this specification. Class information supplied from the class classifying unit 13 is provided as an address, with mapping coefficients stored at the provided address being supplied to the calculating unit 16.

The delay unit 15 delays blocks supplied from the blocking circuit 11 until the mapping coefficient corresponding to class information for these blocks is read from the mapping coefficient memory 14. The delayed blocks are then supplied to the calculating unit 16.

The calculating unit 16 then carries out prescribed operations using the pixel values for pixels comprising blocks supplied from the delay unit 15 and the mapping coefficient corresponding to the corresponding class of this block as supplied from the mapping coefficients memory 14. In this way, the number of pixels for the image is thinned-out (reduced) and coded data is calculated. That is, when the pixel values for each of the pixels comprising a block outputted by the blocking unit 11 are taken to be $y_1, y_2, \ldots$ and the mapping coefficients corresponding to the class of this block outputted by the mapping coefficient memory 14 are taken to be $k_1, k_2, \ldots$ the calculating unit 16 calculates prescribed coefficient values $f(y_1, y_2, \ldots, k_1, k_2, \ldots)$ taken as thinning-out numbers that are then outputted as the pixels values for one or more representative pixels (e.g., the center pixel) of the block outputted by the blocking unit 11.

When the number of pixels comprising the block for class classifying outputted by the blocking unit 11 is taken to be N, the calculating unit 16 thins the image data out by 1/N and outputs the thinned image data as the coded data.

Thus, it can be seen that the coded data outputted by the calculating unit 16 is not obtained by carrying out so-called simple thinning-out, where the central pixel of a block comprising N pixels is simply extracted and outputted. Rather, the coded data is coefficient values $f(y_1, y_2, \ldots, k_1, k_2, \ldots)$ defined by the N pixels comprising this block as described above. From a different viewpoint, the coefficient values $f(y_1, y_2, \ldots, k_1, k_2, \ldots)$ can be considered to be obtained by simple thinning-out processing, but with the pixel value of the pixel at the center of the block being corrected (adjusted) based upon peripheral pixel values. The coded data that is the data obtained from the results of computing the mapping coefficient and the pixels comprising the block is hereinafter referred to as corrected data.

The arithmetic processing occurring at the calculating unit 16 can be considered to be processing that maps the pixel values of each of the pixels comprising the block for class classifying, outputted by the blocking unit 11, to the coefficient values $f(y_1, y_2, \ldots, k_1, k_2, \ldots)$. The coefficients $k_1, k_2, \ldots$ used in this processing are referred to as mapping coefficients.

The transmitting/recording apparatus 17 records the corrected data, supplied as the coded data from the calculating unit 16, onto the recording medium 2 and/or transmits the corrected data via the transmission path 3.

Figure 5:
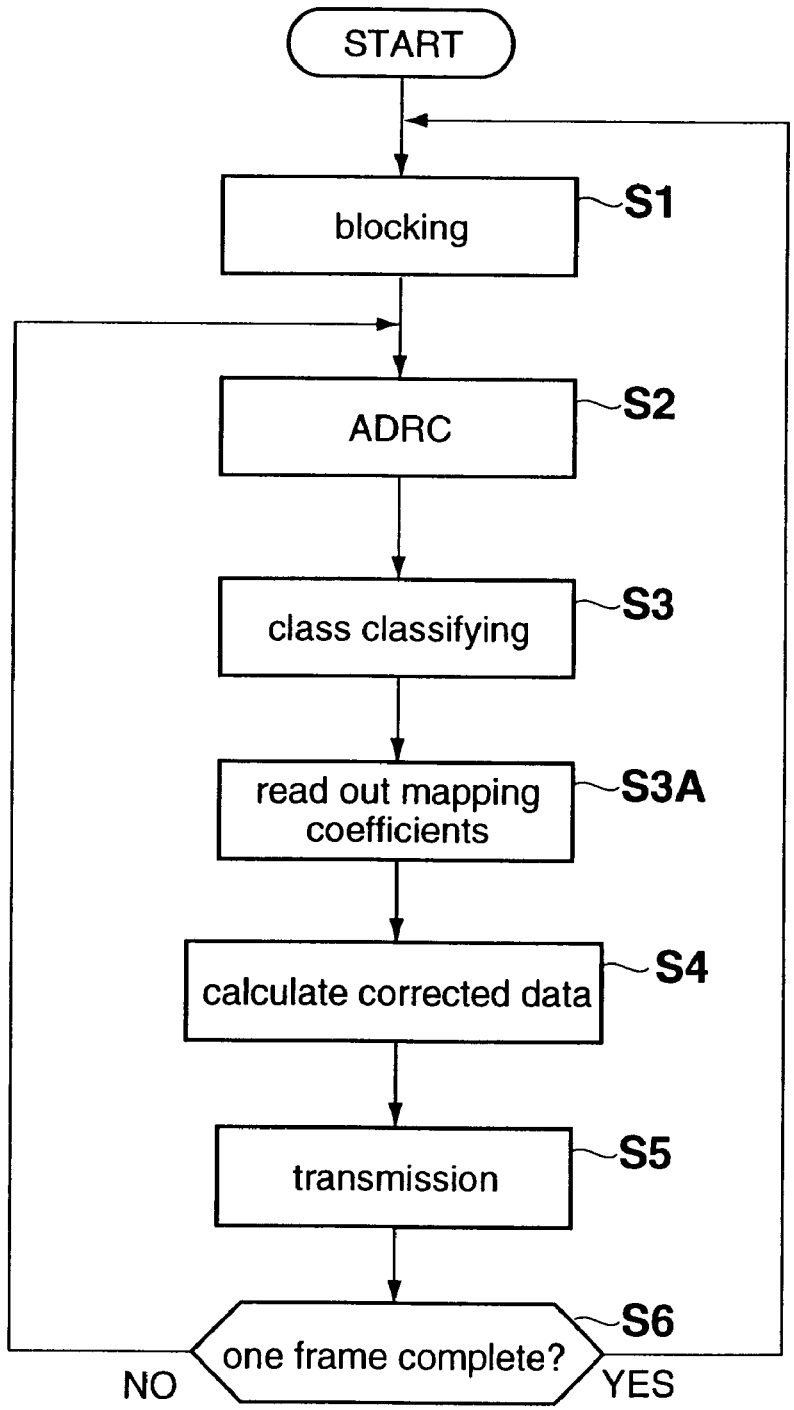
FIG. 5 is a flowchart illustrating the operation of the transmission device of FIG. 2.

Next, this operation is with reference to the flowchart of FIG. 5.

Image data is supplied to the blocking unit 11 in, for example, one frame units. Then, in step S1, the blocking unit 11 divides the image data into nine-pixel class classifying blocks arranged as 3×3 (horizontal, vertical) as shown by, for example, the quadrilateral in FIG. 6 that surrounds pixels Y33(1) through Y33(9). The blocks are supplied to the ADRC processing unit 12 and the delay unit 15, in that order.

While the blocks for class classifying are shown as being 3×3 pixels, square-shaped blocks, it should be understood that the blocks need not be square. For example, they may be rectangular, cross-shaped or have any other arbitrary shape. In addition, the number of pixels of which the blocks consist is not limited to 9 pixels arranged as 3×3. Furthermore, the blocks for class classifying do not have to include directly neighboring pixels but, rather, may include pixels that are more distant from each other. However, the shape and number of pixels do preferably coincide with the shape and number of pixels of blocks used for map coefficient learning, which is described later in this specification.

When the ADRC processing unit 12 receives blocks for class classifying from the blocking unit 11, ADRC processing (e.g., one bit ADRC processing) is carried out on the blocks in step S2 such that blocks are determined with pixels expressed by fewer bits than are the pixels of the original image data. The ADRC-processed blocks are then supplied to the class classifying unit 13.

In step S3, blocks for class classifying provided from the ADRC processing unit 12 are class classified at the class classifying unit 13. The resultant class information is supplied as an address to the mapping coefficients memory 14. At step S3A, mapping coefficients corresponding to the class information supplied by the class classifying unit 13 are then read out from the mapping coefficient memory 14 and supplied to the calculating unit 16.

Meanwhile, at the delay unit 15, blocks provided from the blocking unit 11 are delayed to wait for the reading of the mapping coefficients corresponding to the class information for the block from the mapping coefficient memory 14. After a suitable delay time, the blocks are supplied to the calculating unit 16. At the calculating unit 16, in step S4, the aforementioned function values f(●) (where ● within the parenthesis for this coefficient f is taken to show the set of the pixel values $y_1, y_2, \ldots$ and the mapping coefficients $k_1, k_2, \ldots$) are computed using both the pixel values for each of the pixels comprising the blocks for class classifying that are provided from the delay unit 15 and the mapping coefficients provided from the mapping coefficient memory 14. Corrected data (e.g., a corrected form of the pixel values for the pixels at the center of the pixels of the blocks) are then calculated. The corrected data is then supplied to the transmitting/recording apparatus 17 as coded data for the image.

In step S5, at the transmitting/recording apparatus 17, coded data provided from the calculating unit 16 is recorded on the recording medium 2 and/or transmitted via the transmission path 3.

Then, at Step S6, a determination is made as to whether or not processing has been completed for one frame portion of image data. If it is determined in step S6 that processing has not yet been completed for one frame portion of image data, processing returns to step S2 and the processing from step S2 onwards is repeated on the next block for class classifying. When it is determined in step S6 that processing has been completed for one frame portion of image data, processing returns to step S1 and the processing from step S1 onwards is repeated on the next frame.

Figure 7:
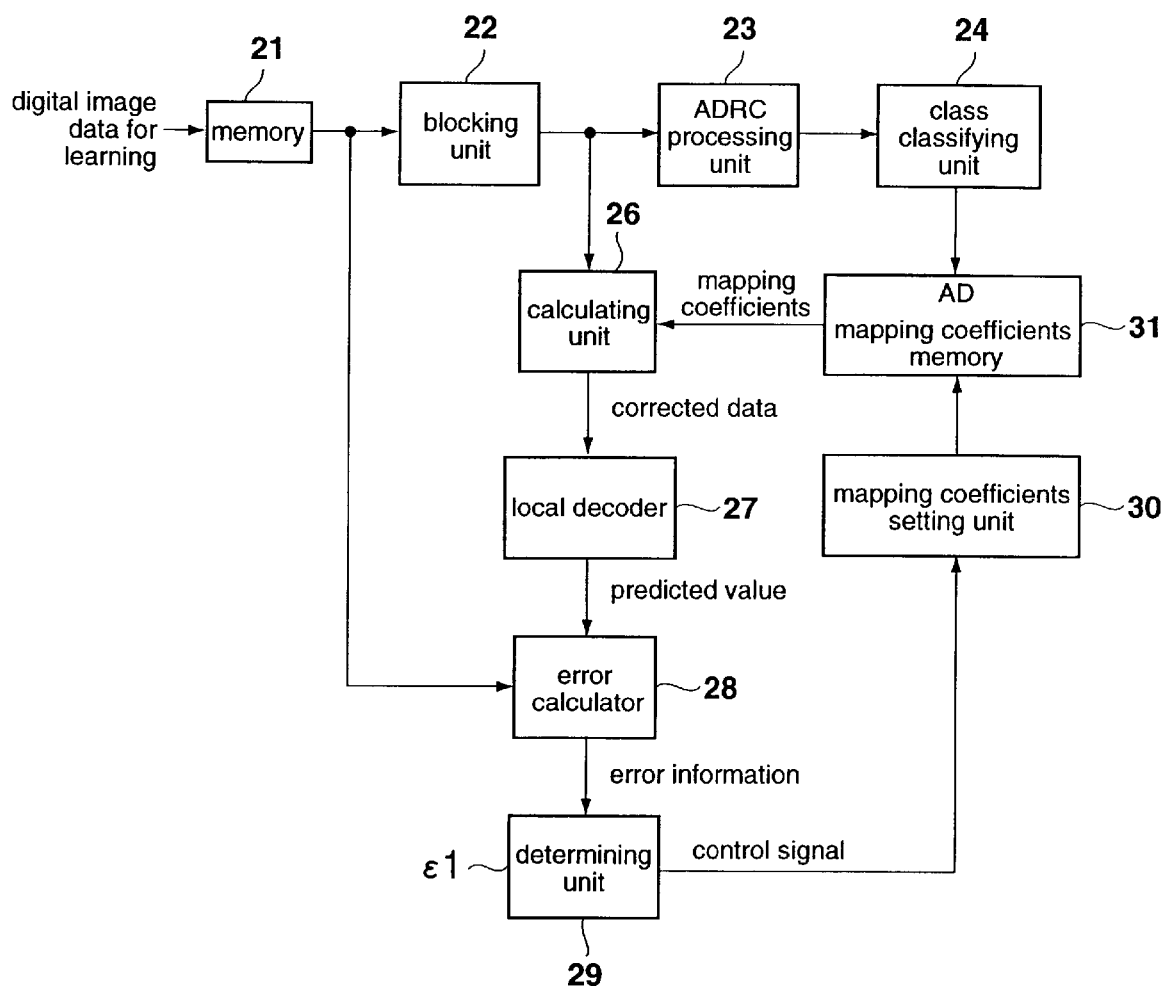
FIG. 7 is a block diagram showing the configuration of the first embodiment of the image processing device for learning in order to obtain mapping coefficients.

Next, FIG. 7 shows an example configuration of an image processing apparatus for carrying out learning (mapping coefficient learning) processing for calculating mapping coefficients. For example, this processing may be employed to determine the mapping coefficients to be stored into the mapping coefficient memory 14 of FIG. 2.

Referring to FIG. 7, one frame or more of the digital image data (hereinafter simply referred to as the image for learning) is stored at the memory 21. The blocking unit 22 then reads image data stored in the memory 21 and supplies blocks (of the same structure as the blocks for class classifying outputted from the blocking unit 11 of the FIG. 2 unit) to the ADRC processing unit 23 and to the calculating unit 26.

The ADRC processing unit 23 and the class classifying unit 24 carry out processing similar to the processing carried out by the ADRC processing unit 12 and the class classifying unit 13 of FIG. 2. Class information for blocks outputted by the blocking unit 22 is outputted from the class classifying unit 24 and supplied to the mapping coefficient memory 31 as an address.

The calculating unit 26 carries out similar calculations as the calculating unit 16 of FIG. 2 using pixels comprising the blocks supplied from the blocking unit 22 and mapping coefficients supplied from the mapping coefficient memory 31. The resulting corrected data (coefficient value f(●)) is then supplied to the local decoder 27.

The local decoder 27 predicts (calculates) predicted values for the original image data for learning (predicted values for pixel values for pixels comprising blocks outputted by the blocking unit 22) based on the corrected data supplied from the calculating unit 26 and supplies these predicted values to the error calculator 28. The error calculator 28 reads pixel values (absolute values) for the image for learning corresponding to predicted values supplied from the local decoder 27 from the memory 21, calculates (detects) predicted value prediction errors of prediction value corresponding to the pixel values for these images for learning and supplies these prediction errors to the determining unit 29 as error information.

The determining unit 29 compares the error information from the error calculator 28 and the prescribed threshold value ε1 and controls the mapping coefficient setting unit 30 so as to correspond to these comparison results. The mapping coefficient setting unit 30 sets up (updates) the installation of the same number of mapping coefficients as the number of classes obtained from the results of class classifying occurring at the class classifying unit 24 under the control of the determining unit 29. The mapping coefficients are supplied to a mapping coefficient memory 31.

The mapping coefficient memory 31 temporarily stores mapping coefficients supplied from the mapping coefficient setting unit 30. The mapping coefficient memory 31 has storage regions capable of storing mapping coefficients (set of mapping coefficients) for just the number of classes into which the class classifying unit 24 may classify the blocks. The new mapping coefficients are then stored in place of already stored mapping coefficients when new mapping coefficients are supplied from the mapping coefficient setting unit 30 for each of the storage regions.

The mapping memory 31 supplies mapping coefficients stored at addresses corresponding to class information supplied from the class classifying unit 24 to an AD input of the mapping coefficients memory 31, and the mapping coefficients memory 31 supplies these coefficients to the calculating unit 26.

Figure 8:
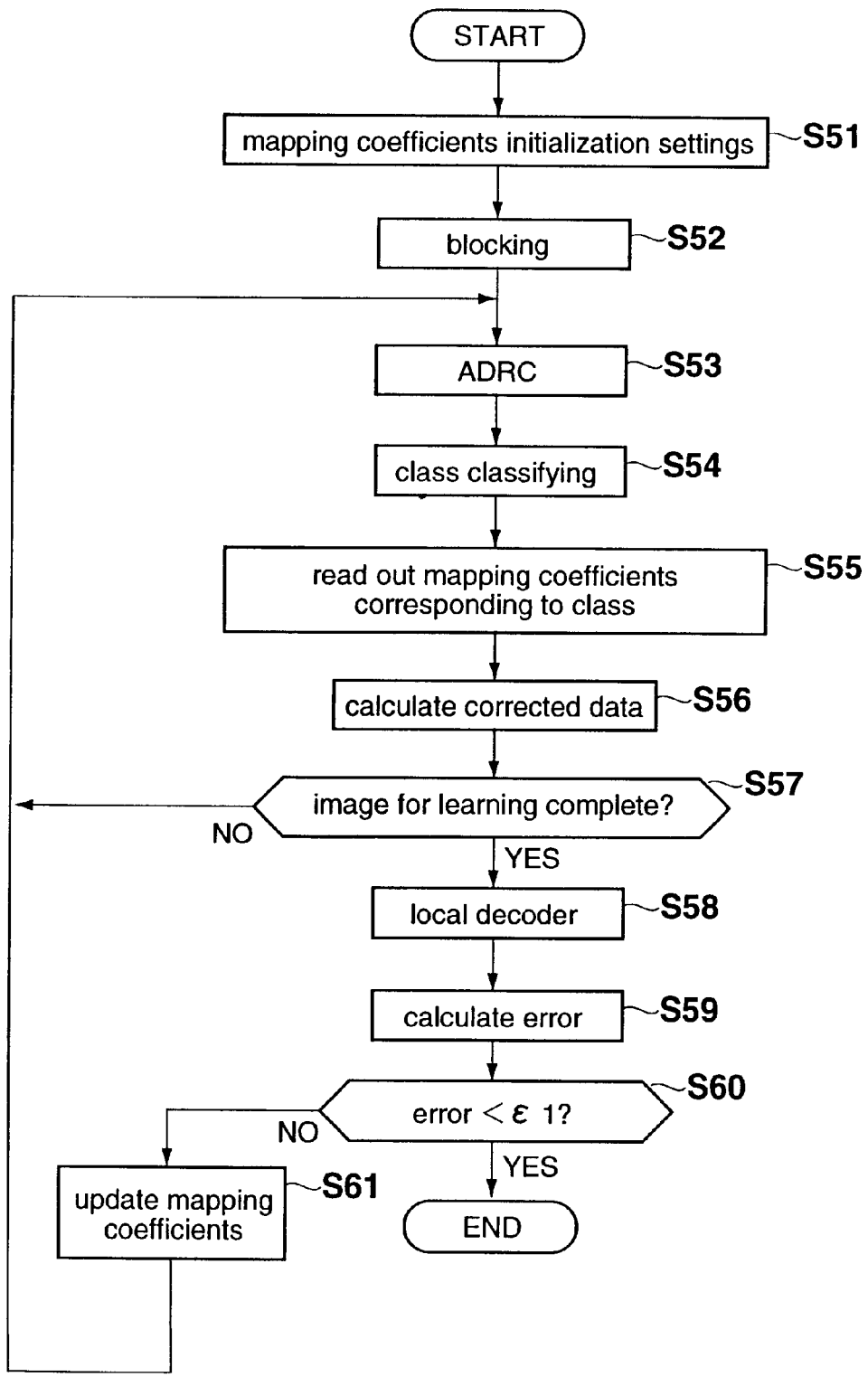
FIG. 8 is a flowchart illustrating the operation of the image processing device of FIG. 7.

The learning operation of the FIG. 7 unit is now described with reference to FIG. 8.

First, in step S51, the mapping coefficient setting unit 30 installs into the mapping coefficients memory initialization values for mapping coefficients for just the number of classes into which the class classifying unit 24 may classify the blocks. Specifically, mapping coefficients (initialization values) from the mapping coefficient setting unit 30 are stored at the address of the region in the mapping coefficient memory 31 that holds mapping coefficients for the class to which the mapping coefficients correspond.

In step S52, the blocking unit 22 puts all of the images for learning stored in the memory 21 into the form of 3×3 pixel blocks, centered about the noted pixel, in a manner similar to the manner in which the blocking unit 11 of FIG. 2 operates. The blocking unit 21 then reads these blocks from the memory 21 and sequentially supplies the blocks to the ADRC processing unit 23 and the calculating unit 26.

In step S53, one-bit ADRC processing is performed on blocks from the blocking unit 22 at the ADRC processing unit 23 in a manner similar to the manner in which the ADRC processor 12 of FIG. 2 operates. The results of ADRC processing are supplied to the class classifying unit 24. In step S54, the classes of the blocks supplied from the ADRC processing unit 23 are decided at the class classifying unit 24, and the decided class information is supplied to the mapping coefficient memory 31 as addresses. Then, in step S55, mapping coefficients are read out from addresses of the mapping memory 31 that correspond to the class information supplied from the class classifying unit 24. The mapping coefficients are then supplied to the calculating unit 26.

When the blocks are received from the blocking unit 22 and the mapping coefficients corresponding to the classes of the received blocks are received from the mapping coefficients memory 31, the calculating unit 26 calculates the aforementioned function values $f(\beta)$ in step S56. In particular, the calculating unit 26 calculates the coefficient values using both the mapping coefficients and the pixel values for pixels comprising blocks supplied from the blocking unit 22. The results of this calculation are then supplied to the local decoder 27 as corrected data corrected from the pixel value for the pixel at the center of the block supplied from the blocking unit 22.

Figure 6:
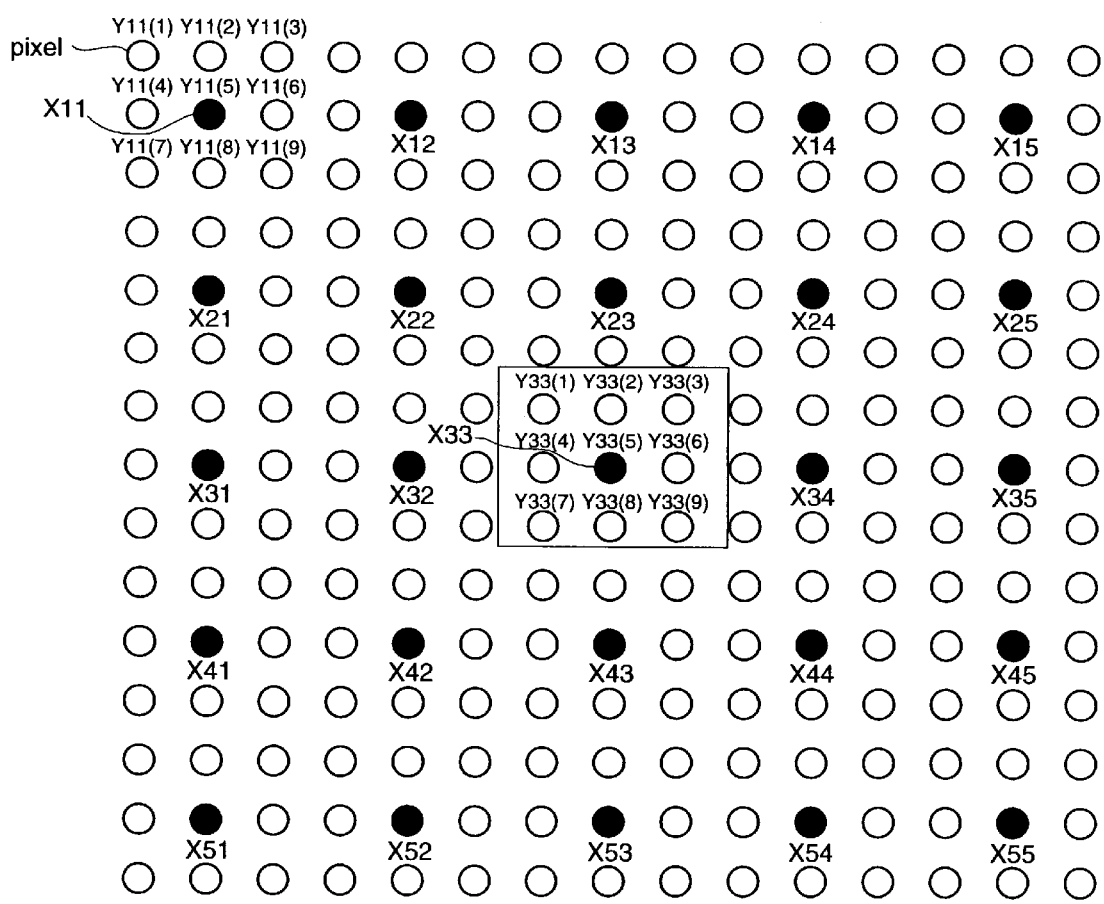
FIG. 6 is a view illustrating the process for the blocking unit 11 of FIG. 2.

When, for example, as shown in FIG. 6, the kind of 3×3 pixel block shown surrounded by the quadrilateral is taken as being outputted from the blocking unit 22, the corrected data corrected for the pixel values for the pixels shown by ● in FIG. 6 is obtained at the calculating unit 26 and outputted to the local decoder 27.

The number of pixels comprising the image for learning is thus thinned-out by ⅑ at the calculating unit 26 and the thinned-out image is supplied to the local decoder 27.

In FIG. 6, when the corrected data corresponding to from the top to the ith and from the left to the jth pixels shown by the mark ● is taken to be expressed by the corrected data $X_{ij}$ and this corrected data $X_{ij}$ is taken to be at the center, the pixel values for the 9 pixels arranged as 3×3 occurring in the original image data for learning (original image data) are expressed, from the leftmost side in the right direction and from the top in the lower direction, by $Y_{ij}(1)$, $Y_{ij}(2)$, $Y_{ij}(3)$, $Y_{ij}(4)$, $Y_{ij}(5)$, $Y_{ij}(6)$, $Y_{ij}(7)$, $Y_{ij}(8)$ and $Y_{ij}(9)$.

Returning to FIG. 8, after the corrected data has been calculated in step S56, processing continues at step S57. At step S57, a determination is then made as to whether or not corrected data has been obtained for all of the images for learning stored in the memory 21. When it is determined in step S57 that corrected data has not yet been obtained for all of the images for learning, processing returns to step S53 and the process from step S53 to step S57 is repeated until corrected data is obtained for all of the images for learning.

When it is determined in step S57 that corrected data has been obtained for all of the images for learning, i.e. when images thinned-out by ⅑ have been obtained for all of the images for learning stored in the memory 21, processing continues at step S58. (it should be noted at this point that these "thinned-out" images are not images for learning merely thinned-out by ⅑. Rather, these thinned-out images are based upon pixel values obtained using mapping coefficients and calculations.) Predicted values for the original images data for learning are then calculated by locally decoding the thinned-out image at the local decoder 27, and the predicted values are supplied to the error calculator 28.

Images comprising predicted values obtained at the local decoder 27 (where, as to be described later, the error information outputted from the error information calculator 28 is smaller than the threshold value ε1) are similar to the decoded images obtained on the side of the receiving device 4 (FIG. 1).

As the error calculator 28, in step S59, the images for learning are read from the memory 21 and prediction errors for the predicted values supplied from the local decoder 27 are calculated with respect to these images for learning. Namely, when the pixel values for the images for learning are expressed as $Y_{ij}$ and the predicted values outputted from the local decoder 27 are expressed as, as the error calculator 28, error dispersion (square sum of the error) Q expressed by the following equation is calculated and supplied to the determining unit 29 as error information.

$$Q = \Sigma (Y_{ij} - )^2$$

In the above equation, Σ indicates the summation of all of the pixels of the images for learning.

When the error information is received from the error calculator 28, the determining unit 29 compares the received error information with a prescribed threshold value ε1 and the size relationship is determined in step S60. When it is determined in step S60 that the error information is greater than the threshold value ε1, i.e. when images comprising predicted values obtained at the local decoder 27 are not recognized to be substantially the same as the original image data for learning, the determining unit 29 outputs a control signal to the mapping coefficient setting unit 30. The mapping coefficient setting unit 30 then updates the mapping coefficients in accordance with a control signal from the determining unit in step S61 with the updated mapping coefficients then being stored anew in the mapping coefficient memory 31.

Processing then returns to step S53, and processing from step S53 onwards is repeated using the updated mapping coefficients stored in the mapping coefficient memory 31.

Changes in the mapping coefficients occurring at the mapping coefficient setting unit 30 can also be carried out in a random manner. Further, changes can be made to have the same tendency as a previous time when the current error information is smaller than the error information for the previous time, with changes being made to be opposite of the tendency of the previous time when the error information for the current time is larger than the error information for the previous time.

Further, changes in the mapping coefficients can be carried out for either all or just some of the classes. When changes are made to mapping coefficients for just some of the classes, for example, it is preferable that classes that strongly influence the error information are detected and just the mapping coefficients for these kinds of classes are changed. Classes that strongly influence the error information can be found, for example, as follows. First, the error information is obtained by carrying out error processing using initialization values for the mapping coefficients. Mapping coefficients are then changed by just the same amount for each class, with the resulting error information being compared with error information obtained when the initialization values are used. Classes for which this difference is greater than or equal to a prescribed value can then be detected as classes having a strong influence with respect to the error information.

When a plurality of these mapping coefficients of, as described above, k1, k2, . . . are taken to be one set, just the mapping coefficients having a strong influence with respect to this information is updated.

In the above case the mapping coefficients are set up for each class but these mapping coefficients can also, for example, be set up independently for each block or can be set up in units of neighboring block units.

When the mapping coefficients are, for example, set-up independently for each block, a plurality of sets of mapping coefficients can be obtained for any one class (on the other hand, mapping coefficients also occur for which not even one set can be obtained). As it is then necessary to finally decide the mapping coefficients for each class, when a plurality of sets of mapping coefficients are obtained for a certain class, it is necessary to decide one set of mapping coefficients by carrying out some kind of processing taking the plurality of sets of mapping coefficients as an object.

On the other hand, when it is determined in step S60 that the error information is smaller than the threshold value ε1, i.e. when the image comprising predicted values obtained at the local decoder 27 is confirmed to be the same as the original image data for learning, the process is complete.

At this time, mapping coefficients stored in the mapping coefficient memory 31 for each class are taken as being optimum for obtaining corrected data capable of decoding the decoding image and are stored into the mapping coefficient memory 14 of FIG. 2.

An image that is almost identical to the original image data can then be obtained on the side of the receiving device 4 (FIG. 1) by generating corrected data using the learned mapping coefficients stored in the mapping coefficient memory 14.

In the embodiment in FIG. 7, as described above, the image is put into the form of blocks of 9 pixels arranged as 3×3, centered about the noted pixel, at the blocking unit 22. Further, one bit ADRC processing is carried out at the ADRC processor 23. The number of classes obtained by class classifying using the class classifying unit 24 is therefore 512 ($=(2_1)_9$) and 512 sets of mapping coefficients can therefore be obtained.

Figure 9:
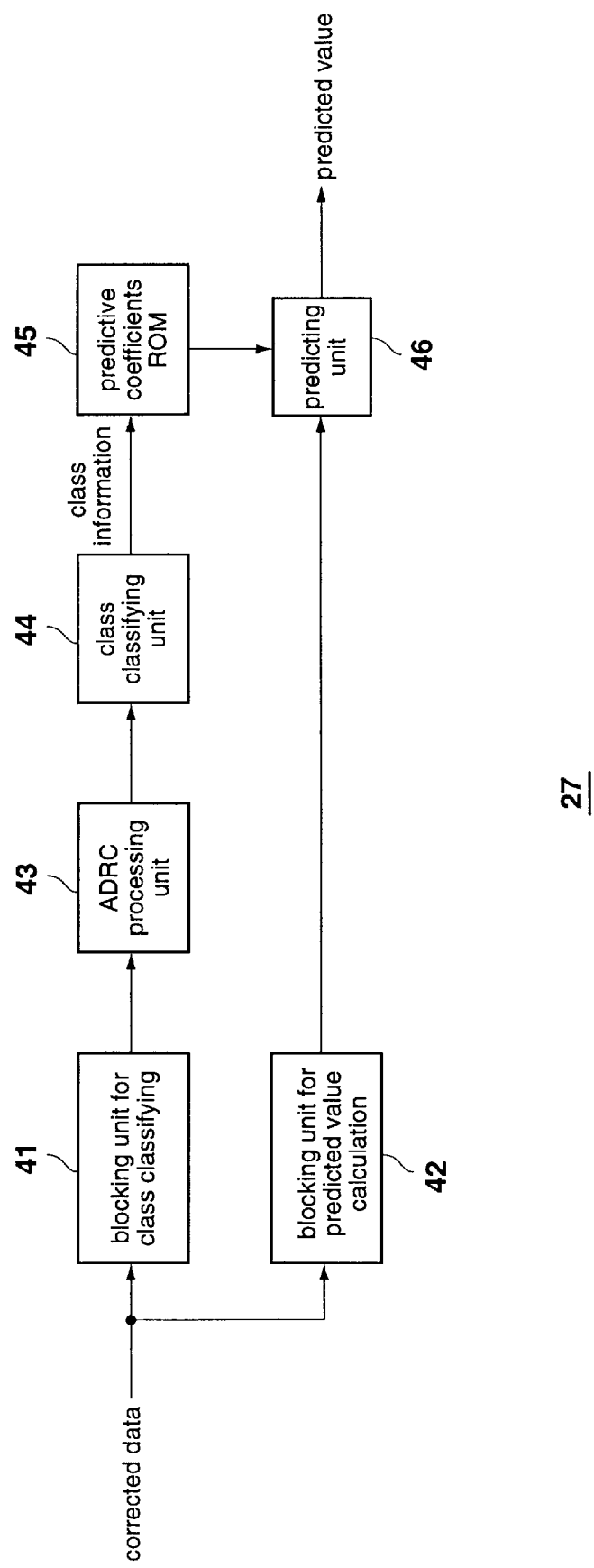
FIG. 9 is a block diagram showing an example configuration of the local decoder 27 of FIG. 7.

Next, an example configuration of the local decoder 27 of FIG. 7 is shown in FIG. 9.

Corrected data from the calculating unit 26 is supplied to the blocking unit for class classifying 41 and the blocking unit for predicted value calculation 42. The blocking unit for class classifying 41 then puts the corrected data into the form of blocks, centered about the noted corrected data, in units of blocks.

Namely, as described above with respect to FIG. 6, when the top to the ith and left to the jth corrected data (compressed data) (or pixel) (portion shown by the mark ● in FIG. 6) is expressed as $X_{ij}$, the blocking unit for class classifying 41 generates a class classifying block comprising a total of nine pixels of the eight pexels $X_{(i-1)(j-1)}$, $X_{(i-1)}$, $X_{(i-1)(j+1)}$, $Xi_{(j-1)}$, $Xi_{(j+1)}$, $X_{(i-1)(j-1)}$, $X_{(i-1)}$, $X_{(i+1)(j+1)}$, to the upper left, top, upper right, left, right, lower left, bottom, and lower right of the noted pixel $X_{ij}$, plus the noted pixel itself. This class classifying block is then supplied to an ADRC processing unit 43.

Blocks for class classifying obtained at the blocking unit 41 of FIG. 9 have a configuration for deciding classes of blocks obtained from predicted values and differs in this respect from the blocks generated at the blocking unit 11 of FIG. 2 for deciding the classes of blocks for which corrected data is calculated.

The blocking unit for predicted value calculation 42 puts the corrected data into the form of blocks for predicted value calculation, centered about the noted corrected data, that are units for calculating predicted values for the original image data (the image for learning). Namely, in this embodiment, for example, taking the corrected data $X_{ij}$ as the center and expressing the nine pixel values of 3×3 occurring in the original image data (source picture data) as $Y_{ij}(1)$, $Y_{ij}(2)$, $Y_{ij}(3)$, $Y_{ij}(4)$, $Y_{ij}(5)$, $Y_{ij}(6)$, $Y_{ij}(7)$, $Y_{ij}(8)$, $Y_{ij}(9)$, in order to calculate predicted values for the pixels $Y_{ij}(1)$ to $Y_{ij}(9)$, the blocking unit for predicted value calculation 42 generates a square block for predicted value calculation comprising, for example, the twenty-five pixels of $X_{(i-2)(j-2)}$, $X_{(i-2)(j-1)}$, $X_{(i-2)j}$, $X_{(i-2)(j+1)}$, $X_{(i-2)(j+2)}$, $X_{(i-1)(j-2)}$, $X_{(i-1)(j-1)}$, $X_{(i-1)j}$, $X_{(i-1)(j+1)}$, $X_{(i-1)(j+2)}$, $X_{i(j-2)}$, $X_{i(j-1)}$, $X_{ij}$, $X_{i(j+1)}$, $X_{i(j+2)}$, $X_{(i+1)(j-2)}$, $X_{(i+1)(j-1)}$, $X_{(i+1)j}$, $X_{(i+1)(j+1)}$, $X(i+1)(j+2)$, $X_{(i+2)(j-2)}$, $X_{(i+2)(j-1)}$, $X_{(i+2)j}$, $X_{(i+2)(j+1)}$ and $X_{(i+2)(j+2)}$ centered about the pixel $X_{ij}$ as a 5×5 matrix.

Specifically, for example, a block for prediction error calculation is configured from 25 pixels (corrected data) of $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$ and $X_{55}$ in order to calculate predicted values for the pixels $Y_{33(1)}$ to $Y_{33(9)}$ occurring in the original image enclosed by the quadrilateral shape in FIG. 6.

Blocks for predicted value calculation obtained at the blocking unit for predicted value calculation 42 are supplied to the predicting unit 46.

The number of pixels and shape of the block for predicted value calculation, as with the case for the blocks for class classifying, is also not limited by the above. However, at the local decoder 27, it is preferable for the number of pixels comprising the blocks for predicted value calculation to be larger than the number of pixels comprising blocks for class classifying.

When the above blocking is carried out (this is similar for processes other than blocking processes) and there is no corresponding pixel in the vicinity of the picture frame for the image, processing is carried out as though, for example, the same pixels as the pixels comprising the picture frame exist on the outside.

The ADRC processing unit 43 subjects the blocks (blocks for class classifying use) outputted by the blocking unit for class classifying 41 to, for example, one-bit ADRC processing and supplies the results to the class classifying unit 44. The class classifying unit 44 class sorts blocks from the ADRC processing unit 43 and supplies class information resulting from this sorting to an address input of an prediction coefficient ROM 45. The prediction coefficient ROM 45 holds prediction coefficients for each class, reads out prediction coefficients held in addresses corresponding to class information when this class information is received from the class classifying unit 44. The prediction coefficients are supplied to the predicting unit 46. Prediction coefficients, for each class, stored in the prediction coefficient ROM 45 are obtained from learning (prediction coefficient learning) to be described later.

The predicting unit 46 calculates (predicts) predicted values for the original image data using blocks for predicted value calculation from the blocking unit for predicted value calculation 42 and prediction coefficients from the prediction coefficient ROM 45.

Figure 10:
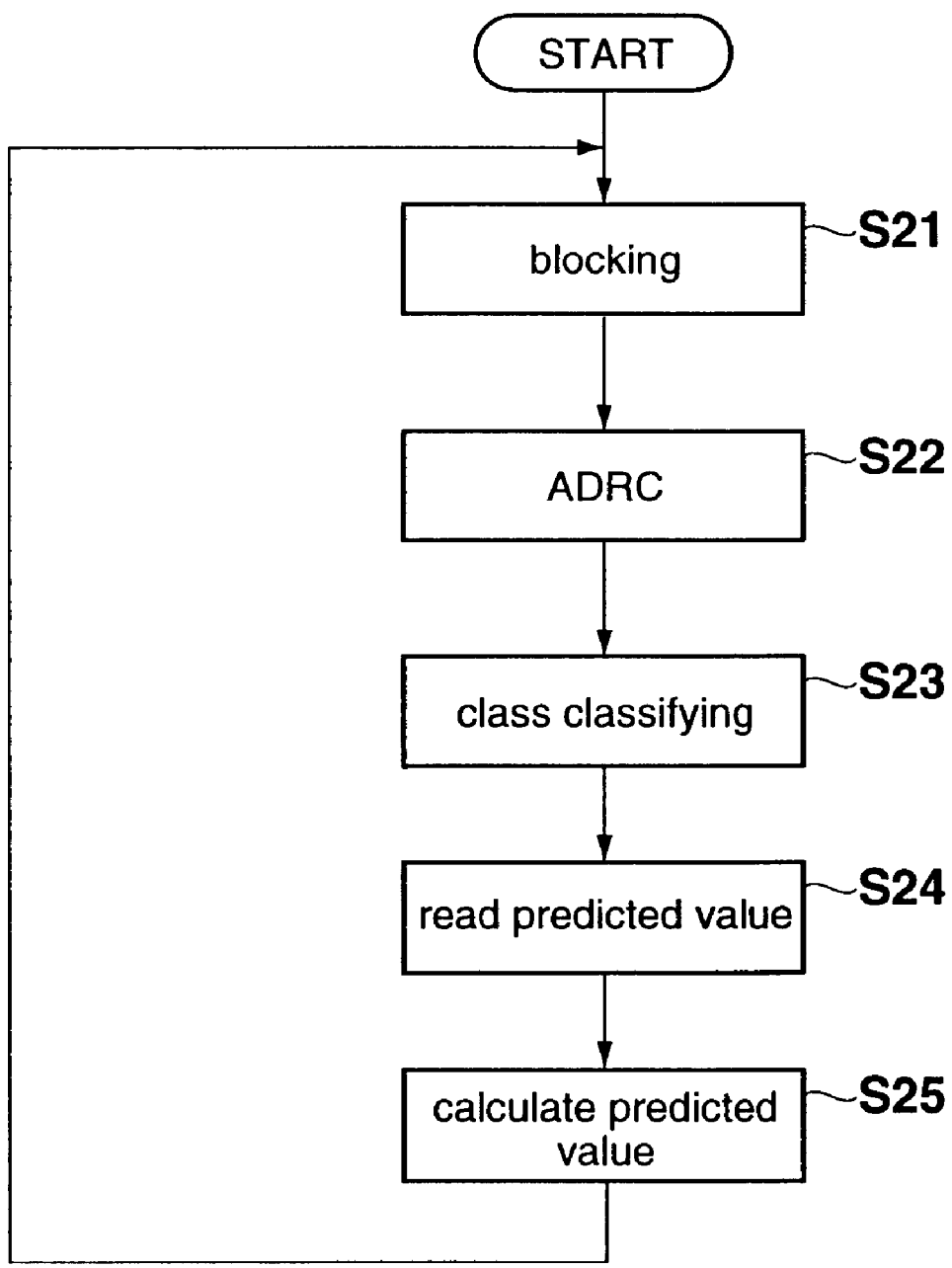
FIG. 10 is a flowchart illustrating a process for the local decoder 27 of FIG. 9.

Next, a description is given of the operation of the FIG. 9 apparatus with reference to the flowchart of FIG. 10.

First, in step S21, the local decoder 27 puts corrected data from the calculating unit 26 into the form of blocks. Namely, at the blocking unit for class classifying 41, the corrected data is put into the form of 3×3 pixel blocks for class classifying centered about the noted corrected data, and supplied to the ADRC processing unit 43. Further, at the blocking unit for predicted value calculation 42, the corrected data is put into the form of 5×5 pixel blocks for predicted value calculation, centered about the noted corrected data, and supplied to the predicting unit 46.

Corresponding blocks for class classifying and blocks for predicted value calculation are generated at the blocking unit for class classifying 41 and the blocking unit for predicted value calculation 42, i.e. when, for example, a 3×3 pixel block for class classifying use centered about the corrected data $X_{33}$ for FIG. 6 at the blocking unit for class classifying 41, a 5×5 pixel block for predicted value calculation centered about the same corrected data X33 is generated for the block for predicted value calculating.

In step S22, when the blocks for class classifying are received, the ADRC processing unit 43 subjects the blocks for class classifying to, for example, one bit ADRC (ADRC carried out using one bit quantization) processing so that the corrected data is converted (coded) into one bit and outputted to the class classifying unit 44. In step S23, the class classifying unit 44 subjects the blocks for class classifying that have been ADRC processed to class classifying processing. Namely, the class classifying unit 44 detects a state of distribution of each of the pixel levels in the block and determines on this basis the classes to which these class classifying blocks belong. The results of this class determination are then supplied to the prediction coefficient ROM 45 as class information.

In the embodiment of FIG. 10, each of the blocks for class classifying use belong to one of the 512 ($=(2^1)^9$) classes because class classifying dividing has been carried out on the blocks for class classifying comprising 9 pixels arranged as 3×3 that have undergone one-bit ADRC processing.

Processing proceeds at step S24 where 25×9 prediction coefficients are read from addresses of the prediction coefficient ROM 45 corresponding to the class information supplied from the class classifying unit 44. Then, in step S25, the predicting unit 46 calculates predicted values for the pixel values y of the original image data in accordance with, for example, the following kind of linear first order equation using these 25×9 prediction coefficients and the 25 pixel values comprising the block for predicted value calculation from the blocking unit for predicted value calculation 42.

$$=w_1x_1+w_2x_2+\ldots$$

where $w_1$, $w_2$, . . . represent prediction coefficients and $x_1$, $x_2$, . . . represent pixel values (corrected data) for pixels comprising blocks for predicted value calculating.

Pixel values for 9 pixels are calculated from the 25 pixels comprising the block for predicted value calculating in the embodiment of FIG. 9, as described above.

Specifically, for example, class information C for the block for class classifying comprising the 3×3 corrected data $X_{22}$ to $X_{24}$, $X_{32}$ to $X_{34}$, $X_{42}$ to $X_{44}$ centered about the corrected data $X_{33}$ shown in FIG. 6 is outputted from the class classifying unit 44 and a block for predicted value calculation comprising corrected data $X_{11}$ to $X_{15}$, $X_{21}$ to $X_{25}$, $X_{31}$ to $X_{35}$, $X_{41}$ to $X_{45}$ and $X_{51}$ to $X_{55}$ for the 5×5 pixels centered about the corrected data $X_{33}$ is outputted from the blocking unit for predicted value calculation 42 as a block for predicted value calculation.

Here, $w_1(k)$ to $w_{25}(k)$ are stored at the prediction coefficient ROM 45 at an address corresponding to the class information C so as to be installed as the prediction coefficient for that class.

Predicted values to for the pixel values to for the 3×3 pixels (the portion of FIG. 6 surrounded by the quadrilateral) occurring at the original image data centered about the corrected data $X_{33}$ are then calculated in accordance with the following equation.

$=w_1(k)X11+w_2(k)X_{12}+w_3(k)X_{13}$ $+w_4(k)X_{14}+w_5(k)X_{15}+w_6(k)X_{21}$ $+w_7(k)X_{22}+w_8(k)X_{23}+w_9(k)X_{24}$ $+w_{10}(k)X_{25}+w_{11}(k)X_{31}$ $+w_{12}(k)X_{32}+w_{13}(k)X_{33}$ $+w_{14}(k)X_{34}+w_{15}(k)X_{35}$ $+w_{16}(k)_{x4}1+w_{17}(k)X_{42}$ $+w_{18}(k)X_{43}+w_{19}(k)X_{44}$ $+w_{20}(k)X_{45}+w_{21}(k)X_{51}$ $+w_{22}(k)X_{52}+w_{23}(k)X_{53}$ $+w_{24}(k)X_{54}+w_{25}(k)X_{55}$

When nine predicted values are obtained in step S24, processing returns to step S21 and the process of step S21 to step S24 is repeated so as to obtain predicted values in nine pixel units.

Figure 11:
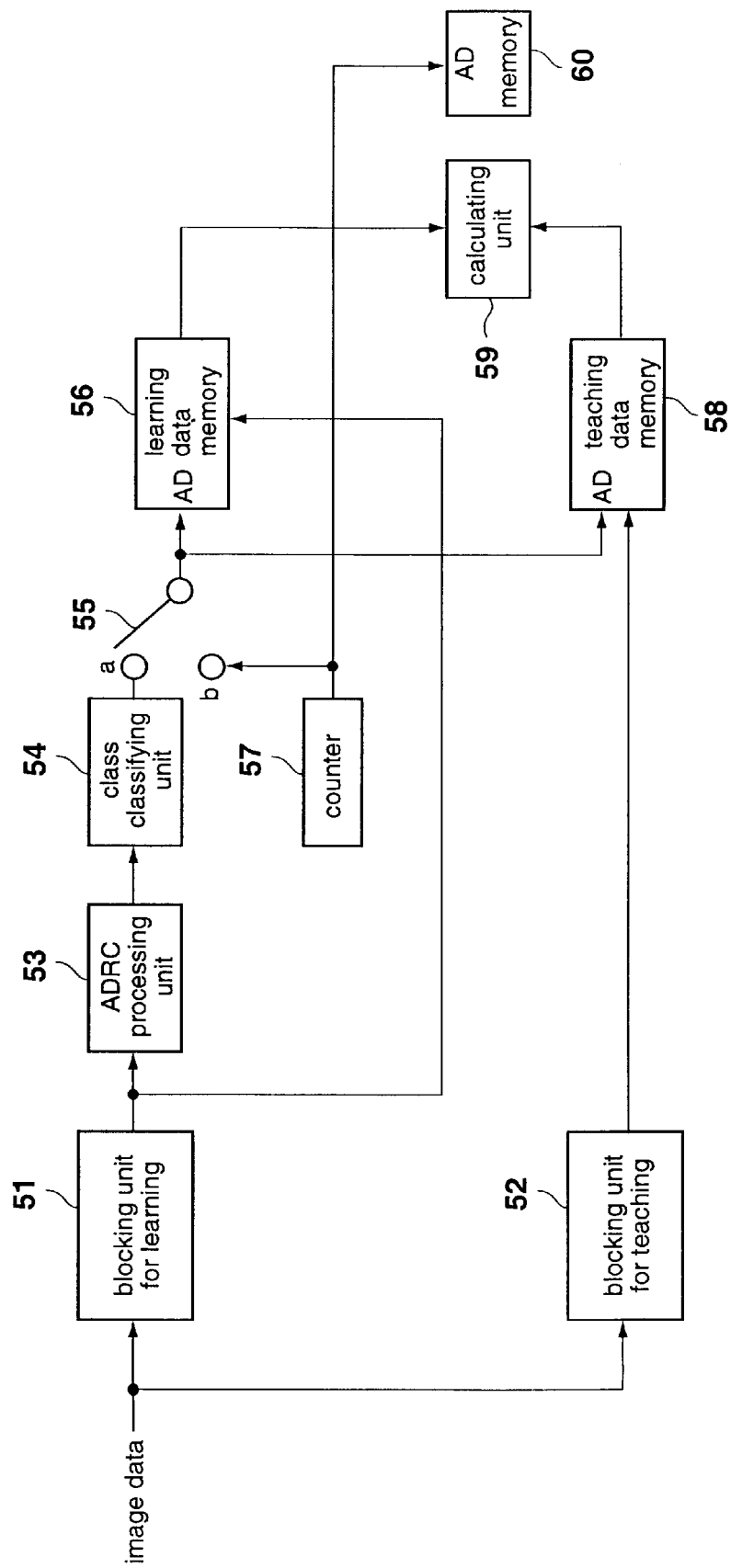
FIG. 11 is a block diagram showing the configuration of the embodiment of the image processing device for carrying out learning in order to obtain prediction coefficients.

Next, FIG. 11 shows an example configuration of an image processing device for carrying out learning (prediction coefficient learning) for obtaining prediction coefficients stored in the prediction coefficient ROM 45 of FIG. 9.

Image data (learning images) for learning for obtaining prediction coefficients suitable for all images are supplied to a blocking unit for learning 51 and a blocking unit for teaching 52.

The blocking unit for learning 51 extracts 25 pixels (5×5 pixels) of the positional relationship shown by the mark ● in FIG. 6, centered about the noted pixel, from the inputted image data. The block comprising these 25 pixels is then supplied to an ADRC processor 53 and a learning data memory 56 as a block for learning.

At the blocking unit for teaching 52 a block comprising, for example, nine pixels arranged as 3×3, centered about the noted pixel, is generated from the inputted image data. The block comprising these 9 pixels is then supplied to a teaching data memory 58 as a block for teaching.

When a block for learning comprising 25 pixels of the positional relationship shown, for example, by the mark ● in FIG. 6 is generated at the blocking unit for learning 51, a 3×3 pixel block for learning shown as being surrounded by the quadrilateral in FIG. 6 is generated at the blocking unit for teaching 52.

The ADRC processor 53 extracts the center 9 pixels (3×3 pixels) from the 25 pixels comprising the block for learning, with one-bit ADRC processing then being performed on this nine pixel block in a similar manner as the ADRC processing unit 43 of FIG. 9. The ADRC-processed 3×3 pixel block is then supplied to a class classifying unit 54. Blocks from the ADRC processor 53 are class-sorted at the class classifying unit 54 in a manner similar to the class classifying unit 9, with the class information obtained being sent to the learning data memory 56 and the teaching data memory 58 via terminal "a" of switch 55.

Blocks for learning from the blocking unit for learning 51 and blocks for teaching from the blocking unit for teaching 52 are stored at addresses corresponding to the provided class information at the learning data memory 56 and the teaching data memory 58, respectively.

At the learning data memory 56, when, for example, the block comprising 5×5 pixels shown by, for example, the mark ● in FIG. 6 is taken as the block for learning and stored at a certain address, the 3×3 pixel block shown to be surrounded by the quadrilateral in FIG. 6 is stored as the block for teaching at a corresponding address in the teaching data memory 58.

The same process is then repeated for all of the images for learning prepared beforehand. In this way, the block for learning and the block for teaching comprising 9 pixels for which predicted values are obtained at the local decoder 27 of FIG. 9 using blocks for predicted value calculation comprising 25 items of corrected data having positional relationships that are the same as the 25 pixels comprising this block for learning are stored at addresses of the learning data memory 56 and corresponding addresses in the teaching data memory 58.

A plurality of information can be stored at the same address at the learning data memory 56 and the teaching data memory 58. In this way, it is possible to store a plurality of blocks for learning and sets of blocks for teaching at the same address.

Next, the switch 55 selecting terminal "a" is switched over to terminal "b". The output of a counter 57 is then supplied to the learning data memory 56 and the teaching data memory 58 as the address. The counter 57 counts in response to a prescribed clock and outputs its count value. The blocks for learning and the blocks for teaching stored at the addresses corresponding to this count value are then read from the learning data memory 56 and the teaching data memory 58, respectively, and supplied to a calculating unit 59.

A set for the block for learning corresponding to the count value of the counter 57 and a set for the block for teaching are then supplied to the calculating unit 59.

The calculating unit 59 receives the set for the block for learning for a certain class and the set for the block for teaching and calculates a prediction coefficient (using, e.g., the least square method) that makes the error a minimum.

For example, when the pixel values of the pixels comprising the blocks for learning are taken to be $x_1, x_2, x_3, \ldots$ and the prediction coefficients to be obtained are taken to be $w_1, w_2, w_3, \ldots$, blocks for learning are configured using linear primary combination and in order to obtain a pixel value y for a certain pixel it is necessary for the prediction coefficients $w_1, w_2, w_3, \ldots$ to fulfill the following equation.

$$y=w_1x_1+w_2x_2+w_3x_3+\ldots$$

At the calculating unit 59, prediction coefficients $w_1, w_2, w_3, \ldots$ that make the square error for the predicted values $w_1x_1+w_2x_2+w_3x_3+\ldots$ from blocks for learning of the same class and corresponding blocks for teaching a minimum with respect to the true value y are obtained. Therefore, 25×9 predictive coefficients for each class are calculated by carrying out the above process for each class.

The prediction coefficients obtained at the calculating unit 59 each class are supplied to the memory 60. In addition to the prediction coefficients from the calculating unit 59, count values are also supplied to the memory 60 so that prediction coefficients from the calculating unit 59 can be stored at addresses corresponding to count values from the counter 57.

The most appropriate 25×9 prediction coefficients (the prediction coefficients that make the error a minimum) for predicting 3×3 pixel blocks of a class are stored at addresses corresponding to the class at the memory 60.

The learned prediction coefficients for each class stored at the memory 60 are then stored into the prediction coefficient ROM 45 of FIG. 9.

It is possible to store the mean values of the pixel values comprising the teaching blocks at addresses corresponding to each class at the prediction coefficient ROM 45 rather than storing the actual prediction coefficients. In this case, when the class information is considered, pixel values corresponding to this class are outputted. The local decoder 27 is therefore completed without providing the blocking unit for predicted value calculation 42 and the predicting unit 46.

In the embodiment in FIG. 9, at the local decoder 27, prediction coefficients already obtained in the learning (prediction coefficient learning) described above are stored in preparation in the prediction coefficient ROM 45 and a predicted value is obtained using these prediction coefficients. However, as is discussed in detail later in the specification, with respect to an alternate embodiment, the predicted values can also be obtained at the local decoder 27 using learned image data from memory and the corrected data from the arithmetic unit processing.

Figure 12:
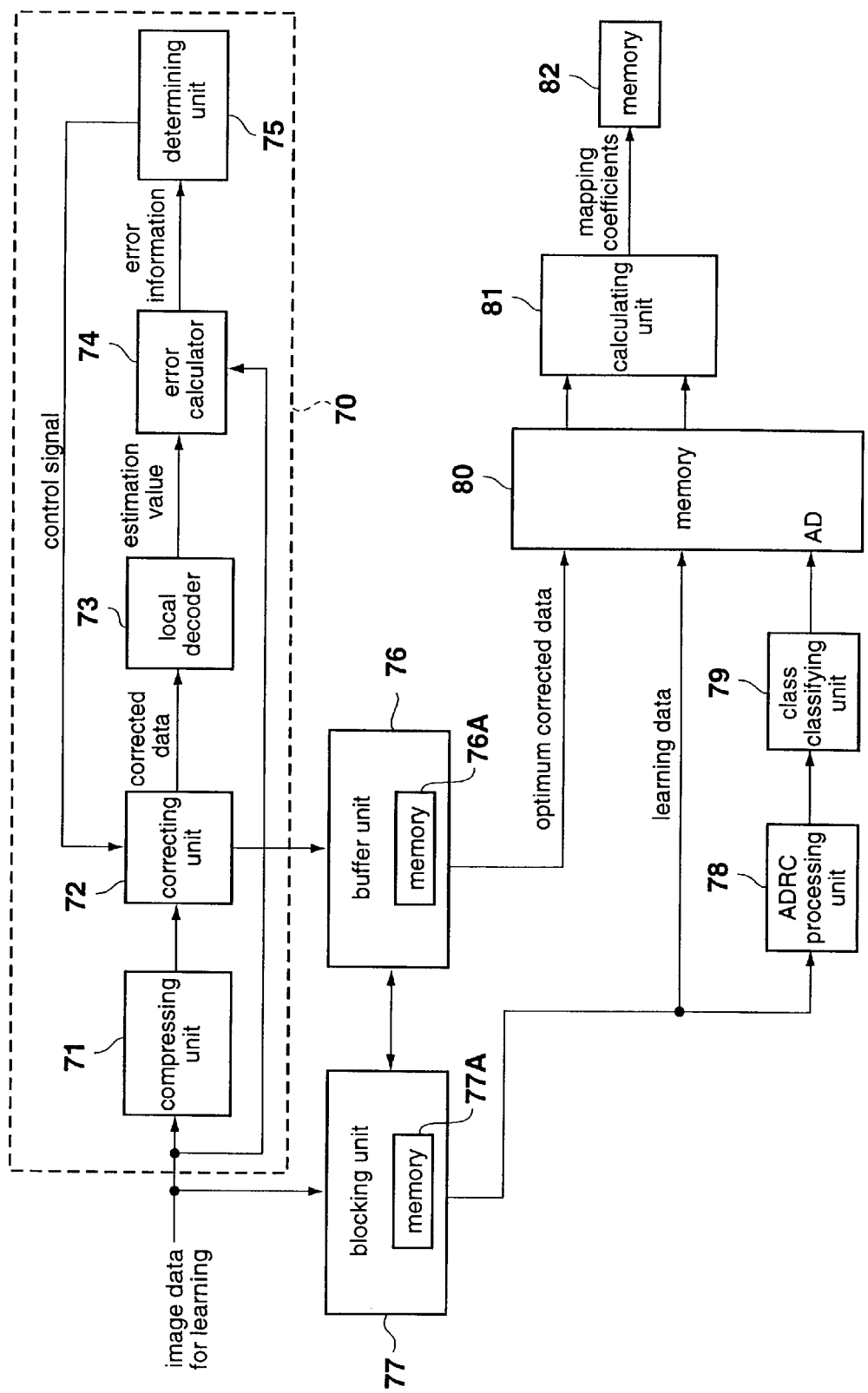
FIG. 12 is a block diagram showing the configuration of a second embodiment of the image processing device for carrying out learning in order to obtain mapping coefficients.

FIG. 12 shows a further example configuration of an image processing device for carrying out learning (mapping coefficient learning) processing for calculating mapping coefficients stored in the mapping coefficient memory 14 of FIG. 2.

According to the image processing device of FIG. 7, the optimum prediction coefficient can be obtained by expressing the function f as, for example, a non-linear equation of a quadratic equation rather than as a linear primary equation. However, in the image signal processing device of FIG. 12, the coefficient f is only expressed using a linear primary equation and the optimum prediction coefficient is obtained.

When the pixel values for each of the pixels comprising the 3×3 pixel blocks, centered about the noted pixel, outputted by the blocking unit 11 in FIG. 2 are taken to be $y_1$, $y_2, \ldots y_9$ and the mapping coefficients outputted by the mapping coefficient memory 14 are taken to be $k_1, k_2, \ldots, k_9$, the image processing device of FIG. 12 is used when the calculating unit 16 calculates the coefficient value $f(y_1, y_2, \ldots k_1, k_2, \ldots)$ so as to obtain corrected data.

$$f(\bullet)=k_1y_1+k_2y_2+ \ldots +k_9y_9$$

The image for learning suited to learning is supplied in, for example, one frame units to the optimum corrected data calculator 70. The optimum corrected data calculator 70 comprises a compressing unit 71, correcting unit 72, local decoder 73, error calculator 74 and determining unit 75. An image is then compressed to a fewer number of pixels from the inputted image for learning and pixel values comprising the optimum image for predicting the original image data are calculated and supplied to a buffer unit 76.

Images for learning supplied to the optimum corrected data calculator 70 are supplied to the compressing unit 71 and the error calculator 74. The compressing unit 71 simply thins out the image for learning at the same ratio as the calculating unit 16 of FIG. 2 thins out pixels. That is, in this embodiment, the image for learning is simply thinned-out by ⅑ (when 9 pixels arranged as 3×3 are taken as one block, just the pixel at the center of this block is extracted) and the image for learning is compressed and supplied to the correcting unit 72.

The correcting unit 72 corrects compressed data (hereinafter referred to as compressed data) that has simply been thinned-out provided from the compressing unit 71 under the control of the determining unit 75. The resulting corrected data (this data is also the corrected form of the pixel value for the center pixel of the 3×3 pixel block in the same way as the output of the calculating unit 16 of FIG. 2 and is hereinafter referred to as corrected data) is supplied from the correcting unit 72 to the local decoder 73.

The local decoder 73 makes predictions for the original image data (image for learning) based on the corrected data from the correcting unit 72 in a similar manner as the local decoder 27 of FIG. 7, with these predicted values then being supplied to the error calculator 74.

The error calculator 74 calculates prediction errors for predicted values from the local decoder 73 with respect to original image data inputted therein in a similar manner as the error calculator 28 of FIG. 7. This prediction error is then supplied to the determining unit 75 as error information.

The determining unit 75 determines whether or not corrected data outputted by the correcting unit 72 is suitable as compression results for the original image data based on error information from the error calculator 74. When the determining unit 75 determines that the corrected data outputted by the correcting unit 72 is not suitable to be used as compression results for the original image data, the correcting unit 72 is controlled and the compressed data is corrected and outputted as new corrected data for the results obtained. Further, when the determining unit 75 determines that corrected data outputted by the correcting unit 72 is suitable as compressed results for the original image data, the corrected data supplied by the correcting unit 72 is supplied to the buffer unit 76 as the optimum corrected data.

The buffer unit 76 includes a memory 76A that stores the optimum corrected data supplied from the correcting unit. Further, the buffer unit 76 reads data of the optimum corrected data stored in the memory 76A corresponding to the central pixel of the block read-out from a memory 77A of the blocking unit 77 and supplies this data to a memory 80. When one frame portion of corrected data is stored at the memory 76A, the buffer unit 76 output a control signal indicating this fact to the blocking unit 77.

The image for learning is supplied to the blocking unit 77 in units of one frame each, in a similar manner to for the optimum corrected data calculator 70. The blocking unit 77 includes a memory 77A for storing images for learning that are supplied thereto. Moreover, when a control signal is received from the buffer unit 76 by the blocking unit 77, the image for learning is stored in the memory 77A in blocks comprising 3×3 pixels in a manner similar as for the blocking unit 11 of FIG. 2. These blocks of the image for learning are then read out in sequence and supplied to an ADRC processing unit 78 and a memory 80.

When a block is read from the memory 77A, a control signal indicating the position of the read block is supplied to the buffer unit 76. The 3×3 pixel blocks read from the memory 77A are then confirmed at the buffer unit 76 based on this control signal and the optimum corrected data corresponding to the central pixel of this block is read from the memory 76A. That is, a certain 3×3 pixel block and optimum corrected data corresponding to this block are both supplied to the memory 80 at the same time.

The ADRC processing unit 78 and the class classifying unit 79 have a similar configuration to the ADRC processing unit 12 and the class classifying unit 13 of FIG. 2, respectively. The class information for the block from the blocking unit 77 outputted by the class classifying unit 79 is then supplied to the memory 80 as an address.

The memory 80 stores the optimum corrected data supplied from the buffer unit 76 and the block supplied from the blocking unit 77 at an address corresponding to the class information supplied from the class classifying unit 79. The memory 80 is capable of storing a plurality of information at a single address. Optimum corrected data and blocks corresponding to certain class information can therefore be stored as a plurality of sets.

A calculating unit 81 reads out the nine pixels $y_1, y_2, \ldots, y_9$ comprising the 3×3 blocks for the image for learning, and the optimum corrected data y' corresponding to this block stored in the memory 80, and the calculating unit 81 applies the least square method so that mapping coefficients $k_1$ to $k_9$ are obtained for each class and supplied to the memory 82. The memory 82 then stores the mapping coefficients $k_1$ to $k_9$ for each class supplied from the calculating unit 81 at addresses corresponding to these classes.

Figure 13:
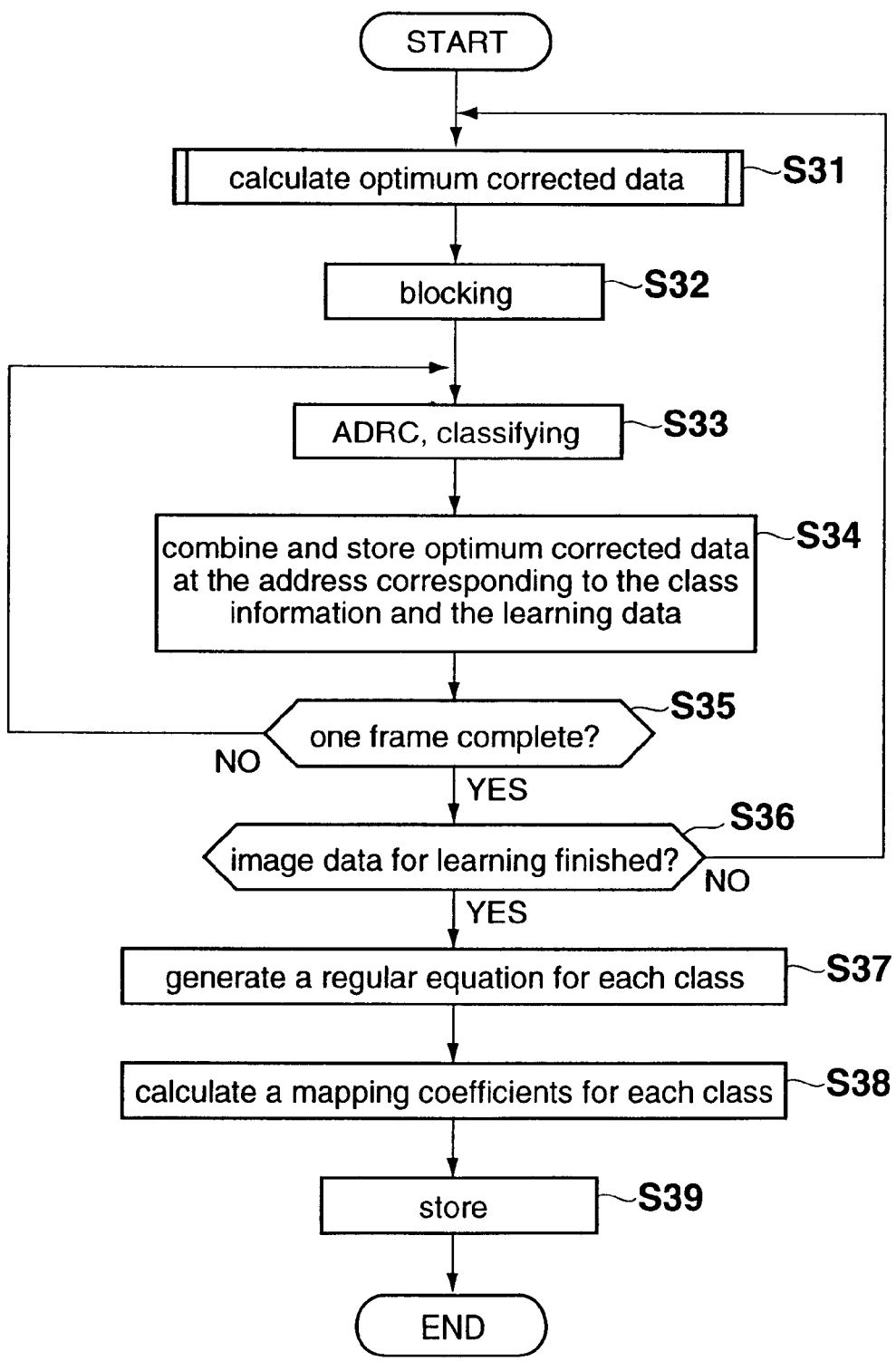
FIG. 13 is a flowchart illustrating the operation of the image processing device of FIG. 12.

Next, the operation of the FIG. 12 "learning" image processing device is described with reference to FIG. 13.

When the image for learning is inputted, this image for learning is stored in the memory 77A of the block unit 77 and is also supplied to the optimum corrected data calculator 70. When the image for learning is received, the optimum corrected data calculator 70 calculates the optimum corrected data for this image for learning in step S31.

Figure 14:
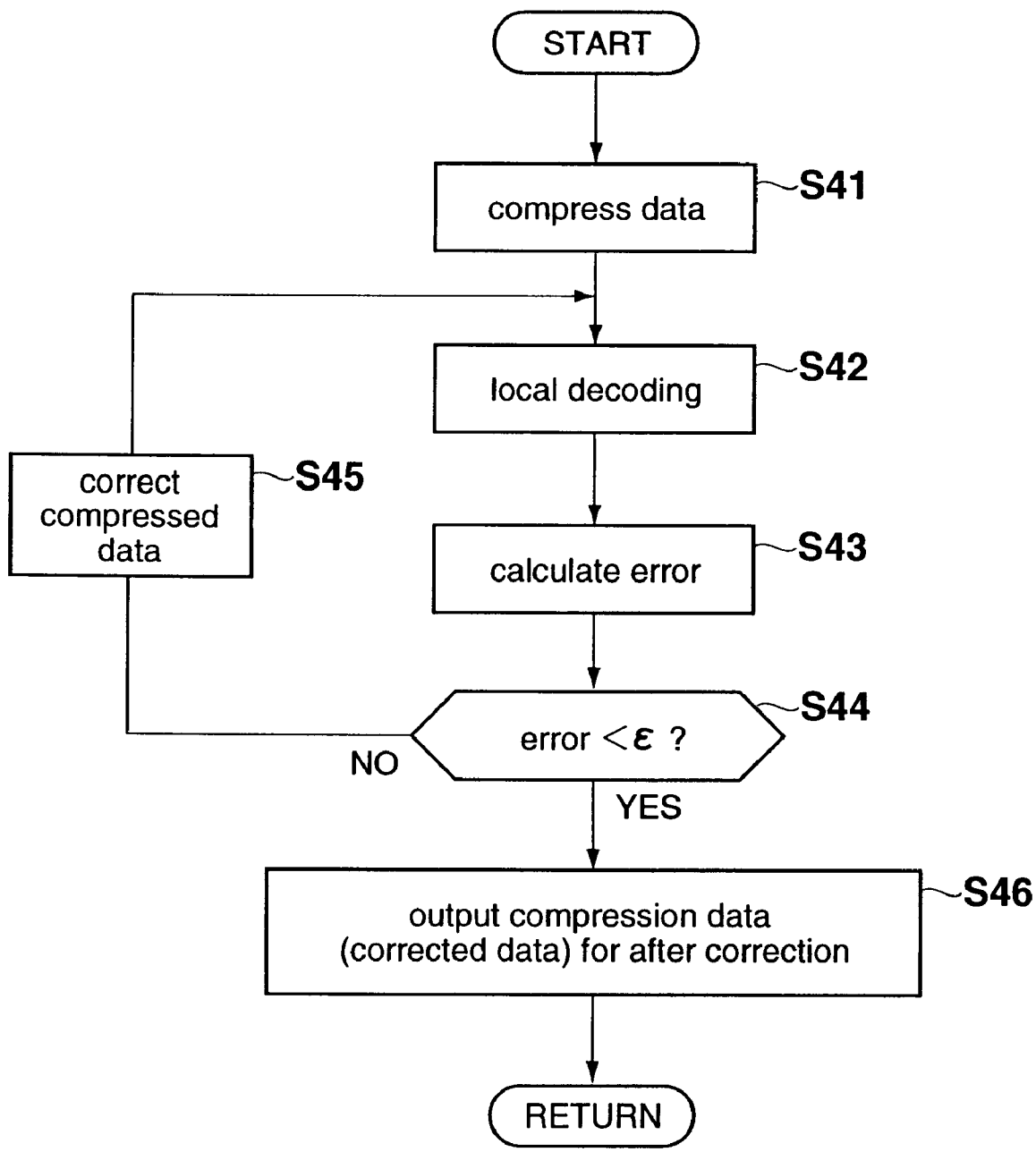
FIG. 14 is a flowchart illustrating the details of the process of step S31 in FIG. 13.

Step S31 is shown in more detail in the flowchart of FIG. 14. Referring to FIG. 14, the compression part 71 generates compressed data by thinning-out the image for learning by 1/9 in step S41 and outputting this data to the local decoder 73, via the correcting unit 72, at least initially without carrying out correction. A predicted value for the original image data is then calculated (i.e., local decoding is carried out) at the local decoder 73 in step S42 based on corrected data from the correcting unit 72. (First, as described above, the image data is simply thinned-out to give compressed data). This predicted value is then supplied to the error calculator 74.

When the predicted value for the original image data is received from the local decoder 73, the error calculator 74 calculates an prediction error for the predicted value from the local decoder 73 with respect to the original image data in step S43 and supplies this as error information to the determining unit 75. When error information is received from the error calculator 74, in step S44, the determining unit 75 makes a determination as to whether corrected data outputted from the correcting unit 72 is suitable as compression results for the original image data based on this error information.

Namely, a determination is made in step S44 as to whether or not the error information is less than a prescribed threshold value $\epsilon$. When it is determined in step S44 that the error information is not less than the prescribed threshold value $\epsilon$, the corrected data outputted by the correcting unit 72 is confirmed to be not suitable for use as the compression data for the original image data. Then, at Step S55, the determining unit 75 controls the correcting unit 72 to correct compressed data outputted by the compressing unit 71. The correcting unit 72, under the control of the determining unit 75, changes the corrected amount (corrected value Δ), corrects the compressed data and outputs the resulting corrected data to the local decoder 73. Processing then returns to Step S42 and the process is repeated.

It is possible to carry out the correction of the compressed data in the same way as, for example, described above in FIG. 7 for changes in mapping coefficients.

On the other hand, when it is determined in step S44 that the error information is less than the prescribed threshold value, the corrected data outputted by the correcting unit 72 is confirmed to be suitable as compression results for the original image data. The determining unit 75 then outputs corrected data for when error information that is less than the prescribed threshold value $\epsilon$ is obtained from the correcting unit 72 to the buffer unit 76 as optimum corrected data. This data is then stored in the memory 76A of the buffer unit 76 and the FIG. 14 process returns.

When the error information is less than the prescribed threshold value $\epsilon$, the compressed data corrected as correction data is stored in the memory 76A as optimum corrected data. This optimum corrected data has error information that is less than a prescribed threshold value $\epsilon$ and an image almost identical to the original image data (source image data) can then be obtained by using this corrected data to calculate the predicted value.

Returning to FIG. 13, when one frame portion of optimum corrected data is stored in the memory 76A, the buffer unit 76 outputs the control signal to the blocking unit 77. When the control signal is received from the buffer unit 76, in step S32, the blocking unit 77 splits the image for learning stored in the memory 77A into blocks of 3×3 pixels. The blocking unit 77 then reads out blocks for image learning stored in the memory 77A and then supplies these blocks to the ADRC processing unit 78 and the memory 80.

At the same time, when a block is read from the memory 77A, the blocking unit 77 supplies a control signal indicating the position of the read-out block to the buffer unit 76. The buffer unit 76 then confirms 3×3 pixel blocks read from the memory 77A in accordance with this control signal, reads the optimum corrected data corresponding to the central pixels for these blocks and supplies this data to the memory 80.

Processing then goes to Step S33 and the block from the blocking unit 77 is then ADRC processed at the ADRC processing unit 78, with this block then being classified at the class classifying unit 79. The results of class classifying are then supplied to the memory 80 as an address.

At the memory 80, in step S34, the optimum correction data supplied from the buffer unit 76 and the block (learning data) supplied from the blocking unit 77 are stored to correspond to the address corresponding to the class information supplied from the class classifying unit 79.

Processing then proceeds at Step S35, where a determination is made as to whether or not blocks and optimum correction data for one frame portion are stored in the memory 80. If it is determined in step S35 that the blocks and optimum corrected data for one frame portion are not yet stored in the memory 80, the next block is read from the blocking unit 77. The optimum corrected data corresponding to the block from the buffer unit 76 is also read, processing returns to Step S33, and the process is repeated from step S33 onward.

When it is determined in step S35 that one frame portion of blocks and optimum corrected data has been stored at the memory 80, processing proceeds at step S36 and a determination is made as to whether or not processing is complete for all of the images for learning. When it is determined in step S36 that processing is not complete for all of the images for learning, processing returns to Step S31 and the process from step S31 is repeated for the next image for learning.

On the other hand, when it is determined in Step S36 that processing is complete for all of the images for learning, processing proceeds at step S37 and the calculating unit 81 reads out the optimum corrected data and blocks stored in the memory 80 for each class so as to fulfill the regular equation shown in equation (7). Further, in step S38, the calculating unit 81 minimizes the error by resolving this regular equation and calculates mapping coefficients each class. These mapping coefficients are then supplied to the memory 82 for storing in step S39 and the process of FIG. 13 is complete.

When the function f is expressed as a linear primary equation, as described above, the mapping coefficients stored in the memory 82 are made to be stored in the mapping coefficient memory 14 of FIG. 2 for use in coding the image.

There is also the case where just the number of regular equations for obtaining the mapping coefficients cannot be obtained using classes. In this case, at the calculating unit 16 of FIG. 2, the mapping coefficients outputted as, for example, the average value etc. for the nine pixels comprising the 3×3 block outputted from the blocking unit 11, i.e. the $k_1$ to $k_9=\frac{1}{9}$ etc. are set to be default values.

Next, an example configuration of the receiving device 4 (FIG. 1) is discussed with reference to FIG. 15.

Coded data recorded at the recording medium 2 that has been played back or coded data that has been transmitted via the transmission path 3 is played back or received at the receiving/playback device 91 and supplied to the decoder 92.

The decoder 92 includes elements that correspond to the elements of the local decoder 27 (FIG. 9). A predicted value is obtained from the corrected data in a manner similar to the way the local decoder 27 operates. An image including the predicted value is outputted as the decoded image.

The corrected data is data having error information of less than a prescribed threshold value. As a result, an image that substantially identical to the original image data is obtained at the receiving device 4.

Figure 15:
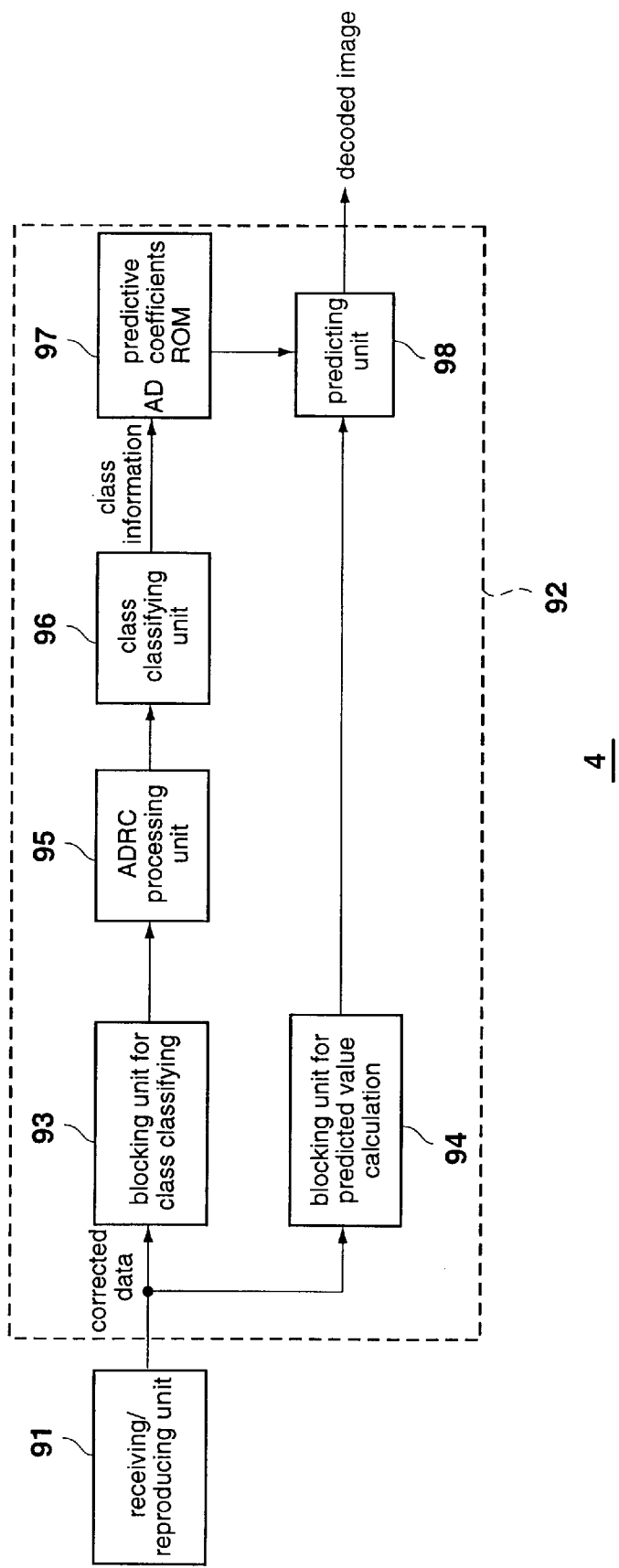
FIG. 15 is a block diagram showing an example configuration of the receiving device 4 of FIG. 1.

A decoded image can be obtained on the receiving side even without the receiving device 4 shown in FIG. 15 by carrying out usual interpolation using a device that decodes by interpolation of the thinned-out image. However, the picture quality (resolution) of the decoded image obtained in this case is inferior.

It should be noted that embodiments of the invention may be utilized to code and decode many different kinds of image signals, from television signals in standard formats (e.g., NTSC) to high-definition television signals that include a relatively large amount of data. Furthermore, in these embodiments, although each process has been described as being carried out for one frame, each process may be carried out for one field, or for two or more frames.

In addition, while block coding has been described as being carried out on images one frame at a time, the blocks can also be, for example, configured by gathering together pixels of the same position in a plurality of time-sequence frames.

Furthermore, the error information has been described as being the square sum of the error but, for example, the absolute value of the error or the sum of the cube (or higher order) of the error can also be used as error information. Which type of information to use as the error information can be decided based on statistical properties (e.g., the convergence).

Figure 16:
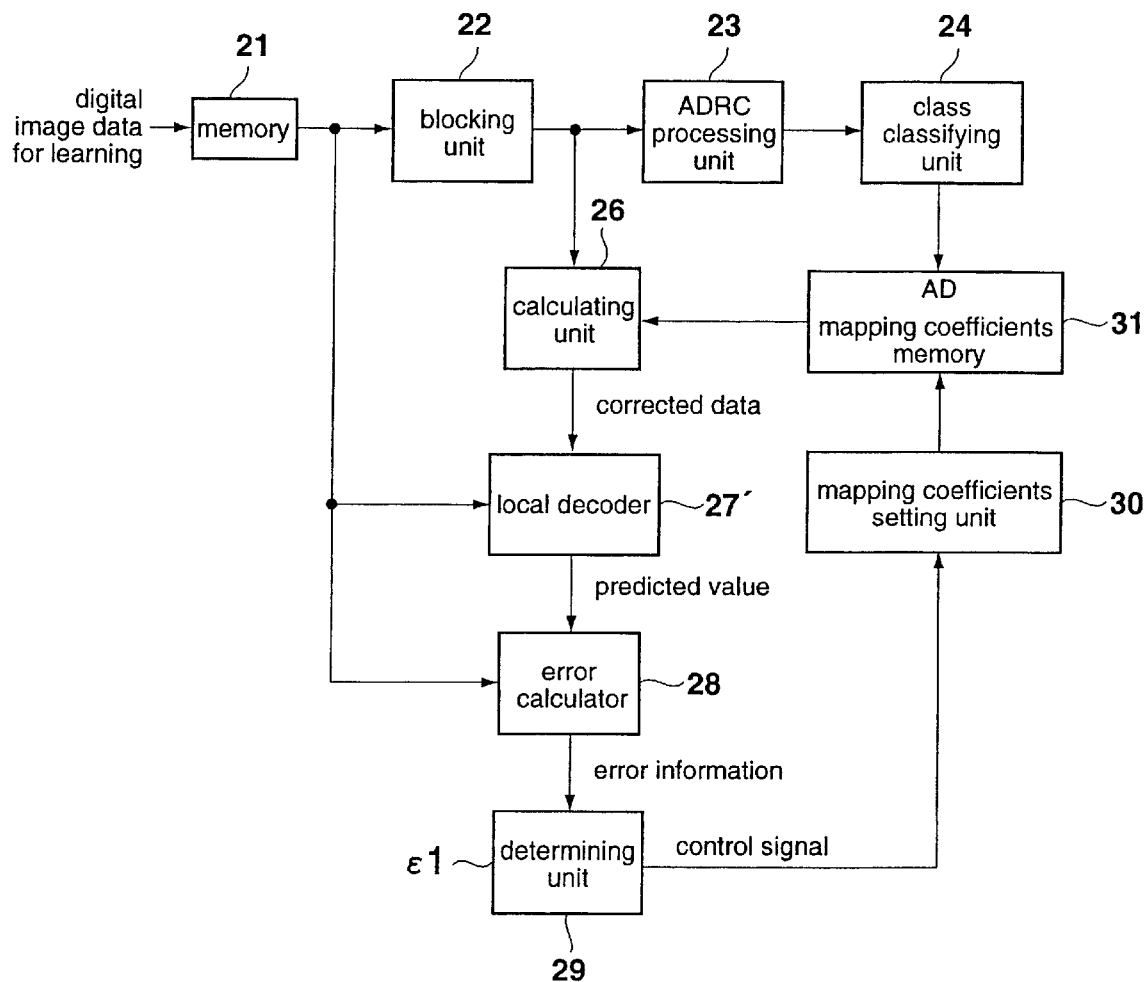
FIG. 16 is a block diagram showing the configuration of another embodiment of the image processing device for learning in order to obtain mapping coefficients.

A further embodiment of the invention is now described with reference to FIGS. 16 through 18. Only the portions of the second embodiment that differ from the first embodiment are described below. In particular, with reference now to FIG. 16, one difference between the image processing device shown therein and the image processing device shown in FIG. 7 is that, in FIG. 16, the image data for learning stored at the memory 21 is provided to the local decoder 27'. In the FIG. 7 apparatus, the image data for learning stored at the memory 21 is not utilized by the local decoder 27.

Figure 17:
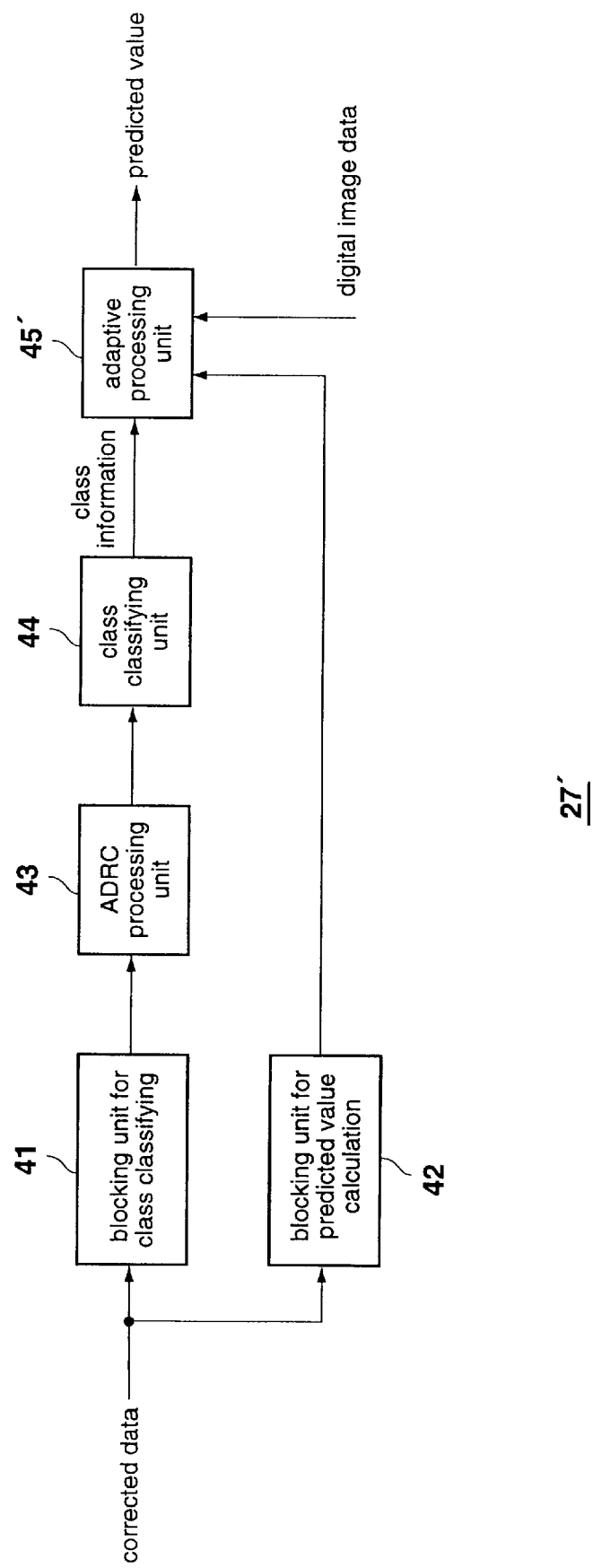
FIG. 17 is a flowchart illustrating the operation of the image processing device of FIG. 16.

Turning now to FIG. 17, a detailed embodiment of the local decoder 27', that uses the image data for learning, is shown. First, it should be remembered that, as is discussed in detail above with respect to FIG. 9, the local decoder 27 generates predicted values on the basis of learned prediction coefficients stored in an estimation coefficients ROM 45 and provided from the ROM responsive to class information of a block of corrected image data. By contrast, the local decoder 27' includes an adaptive processing unit 45' that generates predicted values on the basis of the class information and also on the basis of the digital image data stored in, and provided from, the memory 21 (FIG. 16).

An example of the detailed operation of the adaptive processing 45' is now discussed. Namely, for example, if the predicted value for the pixel values y for the original image data is considered to be obtained using pixel values (hereinafter referred to as learning data) for several pixels $X_1, X_2, \ldots$, in the periphery of the predicted value and a linear primary combination model defined by the linear combination of prescribed prediction coefficients $w_1, w_2, \ldots$, the predicted value can be expressed by the following equation.

$$= w_1 x_1 + w_2 x_2 + \ldots \quad (1)$$

When the matrix W comprising the set of prediction coefficients w, the matrix X comprising the set of learning data x and the matrix Y' comprising the set of predicted values are defined by:

$$X = \begin{pmatrix} X_{11} & X_{12} & \cdots & X_{1n} \\ X_{21} & X_{22} & \cdots & X_{2n} \\ \cdots & \cdots & \cdots & \cdots \\ X_{m1} & X_{m2} & \cdots & X_{mn} \end{pmatrix}$$

$$W = \begin{pmatrix} W_1 \\ W_2 \\ \cdots \\ W_n \end{pmatrix}, Y' = \begin{pmatrix} E[y_1] \\ E[y_2] \\ \cdots \\ E[y_n] \end{pmatrix}$$

the following observed equation is fulfilled.

$$XW = Y' \quad (2)$$

The least square method is then applied to this observed equation and a predicted value near to the pixel value y for the original image data is obtained. In this case, when the matrix Y comprising the set of the pixel values (hereinafter referred to as teaching data) y for the original image data and the matrix E comprising the set of remainders e for the predicted values for the pixel values y for the original image data are defined by $$E = \begin{pmatrix} e_1 \\ e_2 \\ \cdots \\ e_m \end{pmatrix}, Y = \begin{pmatrix} y_1 \\ y_2 \\ \cdots \\ y_n \end{pmatrix}$$

the following remainder equation is fulfilled from the equation (2).

$$XW = Y + E \quad (3)$$

In this case, the prediction coefficient wi for obtaining the predicted value near to the pixel value y for the original image data can be obtained so as to make the square error minimum.

$$\sum_{i=1}^{m} e_i^2$$

The square error is therefore differentiated using the prediction coefficients $w_i$ so as to become zero. That is, the prediction coefficients $w_i$ fulfilling the following equation become the optimum value for obtaining an predicted value near the pixel value y for the original image data.

$$e_1\frac{\partial e_1}{\partial w_i} + e_2\frac{\partial e_2}{\partial w_i} + \ldots + \frac{\partial e_m}{\partial w_i} = 0 \quad (i = 1, 2, \ldots, n)$$

The following equation is then fulfilled by first differentiating equation (3) by the prediction coefficient $w_i$.

$$\frac{\partial e_1}{\partial w_i} = x_{i1}, \frac{\partial e_i}{\partial w_2} = x_{i2}, \ldots, \frac{\partial e_i}{\partial aw_n} = x_{in}, (i = 1, 2, \ldots, m) \quad (5)$$

Equation (6) can then be obtained from equation (4) and equation (5).

$$\sum_{i=1}^{m} e_i x_{i1} = 0, \sum_{i=1}^{m} e_i x_{i2} = 0, \ldots \sum_{i=1}^{m} e_i x_{in} = 0$$

The following regular equation can then be obtained from equation (6) by considering the relationship between the learning data x occurring in equation (3), prediction coefficient w, teaching data y and remainder e. removebr $$\begin{cases} \left(\sum_{i=1}^{m} x_{i1}x_{i1}\right)w_1 + \left(\sum_{i=1}^{m} x_{i1}x_{i2}\right)w_2 + \ldots + \left(\sum_{i=1}^{m} x_{i1}x_{in}\right)W_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \ldots + \left(\sum_{i=1}^{m} x_{iw}x_{in}\right)w_n = \left(\sum_{i=1}^{m} x_{i2}y_i\right) \\ \left(\sum_{i=1}^{m} x_{in}x_{i1}\right)w_1 + \left(\sum_{i=1}^{m} x_{in}x_{i2}\right)w_2 + \ldots + \left(\sum_{i=1}^{m} x_{in}x_{in}\right)w_n = \left(\sum_{i=1}^{m} x_{in}y_i\right) \end{cases} \quad (7)$$

The regular equation of equation (7) has just the same number as the number of prediction coefficients w to be obtained. The optimum prediction coefficient w can then be obtained by resolving equation (7). Equation (7) can be resolved by applying, for example, a release method (such as the Gauss Jordan elimination method) etc.

With the above adaptive processing, the optimum prediction coefficient w is obtained, and a predicted value near to the pixel value y for the original image data is obtained from equation (1) using this prediction coefficient w. This adaptive processing can be carried out at the local decoder 27. In this case, it is not necessary to provide a prediction coefficient ROM at the local decoder 27.

Adaptive processing (adaptive processing can also be included when the prediction coefficient ROM 45 is used) differs from interpolation processing in that components included in the original image data that are not included in the thinned-out image are reproduced. Namely, if just equation (1) employed in adaptive processing, this is the same as interpolation processing using a so-called interpolation filter. However, because the prediction coefficient w corresponding to the tap number of this interpolation filter is obtained using learning using the teaching data y, components included in the original image data can be reproduced. The adaptive processing can be said to be a process that is an operation of reproducing the so-called image.

Figure 18:
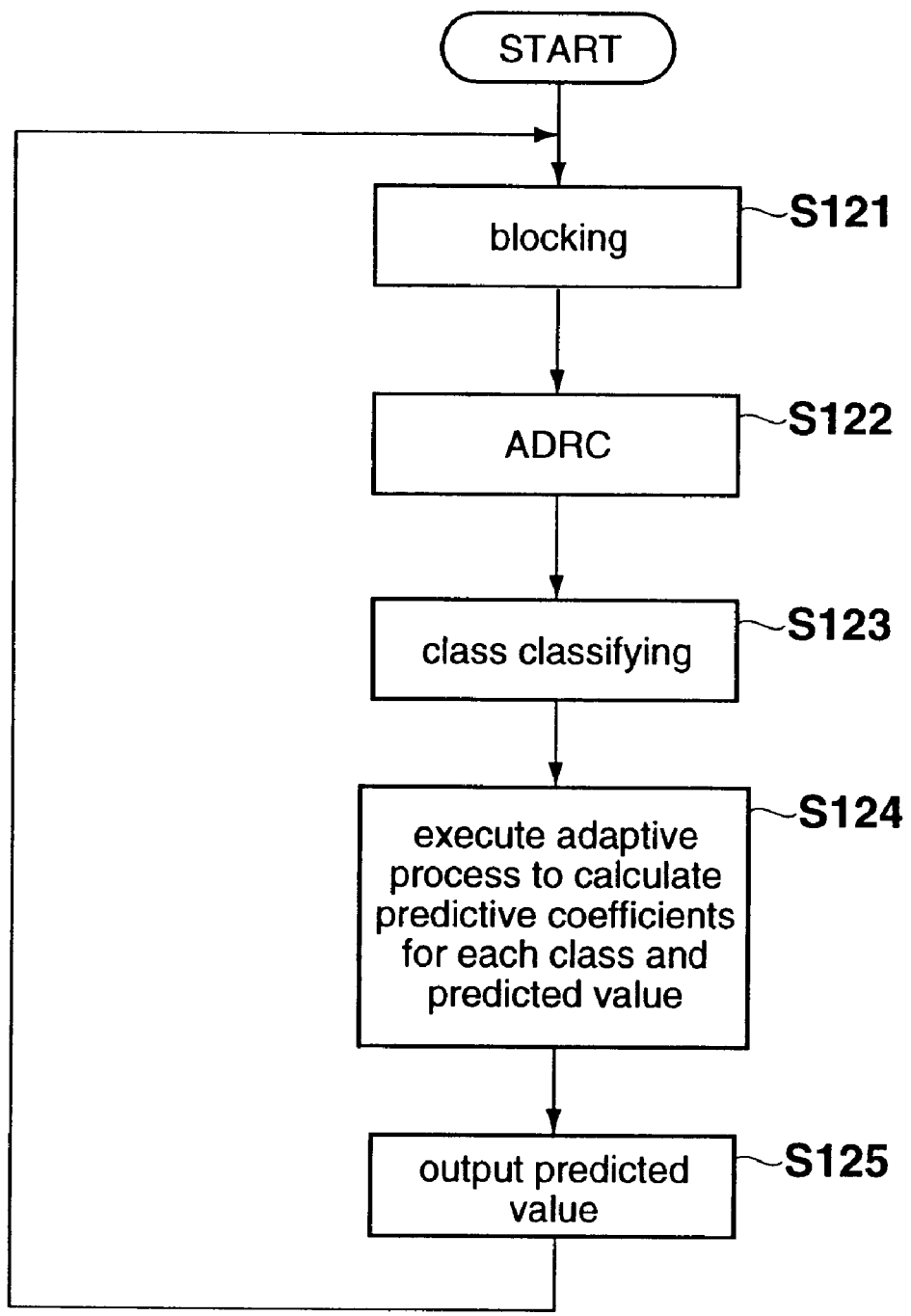
FIG. 18 is a block diagram showing an example configuration of the local decoder 27' of FIG. 16.

Referring now to FIG. 18, a flowchart illustrates the process followed by the local decoder 27' of FIG. 17. At step S121, the blocking unit for class classifying 41 blocks the corrected image data. Next, at step S122, the ADRC processing unit 43 performs ADRC processing on the blocks of the corrected image data. At step S123, the class classifying unit 44 classifies the blocks of the corrected image data in accordance with the ADRC processing unit 43 output. At step S124, the adaptive processing unit 45' calculates predicted coefficients for each class (for the internal use of the adaptive processing unit 45') and also calculates predicted values. At step S125, the predicted values are output from the adaptive processing unit 45' of the local decoder 27'.

Although only certain embodiments have been described in detail, those having ordinary skill in the art will certainly understand that many modifications are possible without departing from the teachings hereof. All such modifications are intended to be encompassed within the scope of the following claims:

What is claimed is:

1. An apparatus for coding original image data, having a plurality of pixels, to generate coded image data, comprising:

means for extracting a plurality of pixels from the original image data and for generating class information corresponding to characteristics of the extracted plurality of pixels, wherein the generated class information indicates one of a plurality of classes;

means for storing mapping coefficients for each of the plurality of classes, wherein the mapping coefficients are generated based on a predicted error of predicted image data for learning and an original image data for learning;

means for reading the mapping coefficients that correspond to the generated class information; and means for producing the coded image data responsive to the original image data and the read mapping coefficients.

2. An apparatus according to claim 1, wherein said producing means produces the coded image data having fewer pixels than the original image data.

3. An apparatus according to claim 1, wherein said producing means includes:

means for extracting a plurality of pixels from the original image data; and means for producing the coded image data by performing calculations on a pixel value for pixels of a block and the read mapping coefficients.

4. An apparatus according to claim 2, wherein the mapping coefficients for each of the plurality of classes are generated responsive to original image data for learning.

5. An apparatus for coding original image data, having a plurality of pixels, to generate coded image data, comprising:

means for extracting a plurality of pixels from the orginal image data and for generating class information corresponding to characteristics of the extracted plurality of pixels, wherein the generated class information indicates one of a plurality of classes;

means for storing mapping coefficients for each of the plurality of classes;

means for reading the mapping coefficients that correspond to the generated class information; and means for producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is minimized.

6. An apparatus for coding original image data, having a plurality of pixels, to generate coded image data, comprising:

means for extracting a plurality of pixels from the original image data and for generating class information corresponding to characteristics of the extracted plurality of pixels, wherein the generated class information indicates one of a plurality of classes;

means for storing mapping coefficients for each of the plurality of classes;

means for reading the mapping coefficients that correspond to the generated class information; and means for producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is less than a prescribed threshold value.

7. An apparatus for coding original image data, having a plurality of pixels, to generate coded image data, comprising:

means for extracting a plurality of pixels from the original image data and for generating class information corresponding to characteristics of the extracted plurality of pixels, wherein the generated class information indicates one of a plurality of classes;

means for storing mapping coefficients for each of the plurality of classes;

means for reading the mapping coefficients that correspond to the generated class information; and means for producing the coded image data responsive to the original image data and the read mapping coefficients, wherein the mapping coefficients for each class are generated by steps of:

extracting a plurality of pixels of the original image data for learning and generating class information corresponding to characteristics of the extracted plurality of pixels;

producing coded data where a number of pixels of the original image data for learning is reduced, responsive to the original image data for learning and mapping coefficients that correspond to class information;

generating predicted image data for learning in accordance with the coded data and generating predicted data having a plurality of predicted pixels;

generating a predicted error of the predicted image data for learning relative to the original image data for learning;

updating the mapping coefficients in accordance with the generated predicted error until the updated mapping coefficients are optimum mapping coefficients; and determining the optimum mapping coefficients.

8. An apparatus for coding original image data, having a plurality of pixels, to generate coded image data, comprising:

means for extracting a plurality of pixels from the original image data and for generating class information corresponding to characteristics of the extracted plurality of pixels, wherein the generated class information indicates one of a plurality of classes;

means for storing mapping coefficients for each of the plurality of classes;

means for reading the mapping coefficients that correspond to the generated class information; and means for producing the coded image data responsive to the original image data and the read mapping coefficients, wherein the mapping for each class is determined by reducing a number of pixels of the original image data to generate compressed data;

correcting the compressed data to generate corrected data;

predicting the original image data in accordance with the corrected data and generating predicted data having a plurality of predicted pixels;

calculating, with respect to the original image data, a predicted error of the predicted data;

determining suitability of the corrected data as coded data based upon the predicted error;

repeating the correcting step until the corrected data is an optimum corrected data;

generating optimum mapping coefficients for each class using the original image data for learning and the optimum corrected data.

9. An apparatus for decoding coded image data generated by coding original image data, comprising:

means for receiving the coded image data; and means for decoding the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes, wherein the mapping coefficients are generated based on a predicted error of predicted image data for learning, and an original image data for learning;

reading the mapping coefficients that correspond to the generated class information; and producing the coded image data responsive to the original image data and the read mapping coefficients.

10. An apparatus according to claim 9, wherein the coded image data has fewer pixels than the original image data.

11. An apparatus according to claim 10, wherein said decoding means includes memory for storing predicted coefficients for each of the plurality of classes used to generate the mapping coefficients;

means for extracting a plurality of pixels of the coded image data and generating class information corresponding to the extracted plurality of pixels;

means for reading predicted coefficients corresponding to the generated class information; and means for producing the decoded image data using the coded image data and the read predicted coefficients.

12. An apparatus according to claim 11, wherein the predicted coefficients for each class are generated using original image data for learning.

13. An apparatus according to claim 10, wherein the mapping coefficients for each class are generated using original image data for learning.

14. An apparatus for decoding coded image data generated by coding original image data, comprising:

means for receiving the coded image data; and means for decoding the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is minimized.

15. An apparatus for decoding coded image data generated by coding original image data, comprising:

means for receiving the coded image data; and means for decoding the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is less than a prescribed threshold value.

16. A method for coding original image data, having a plurality of pixels, to generate coded image data, comprising:

extracting a plurality of pixels from the original image data and for generating class information corresponding to characteristics of the extracted plurality of pixels, wherein the generated class information indicates one of a plurality of classes;

storing mapping coefficients for each of the plurality of classes, wherein the mapping coefficients are generated based on a predicted error of predicted image data for learning, and an original image data for learning;

reading the mapping coefficients that correspond to the generated class information; and producing the coded image data responsive to the original image data and the read mapping coefficients.

17. A method according to claim 16, wherein said producing step produces the coded image data having fewer pixels than the original image data.

18. A method according to claim 16, wherein said producing means includes:

means for extracting a plurality of pixels from the original image data; and means for producing the coded image data by performing calculations on a pixel value for pixels of a block and the read mapping coefficients.

19. A method according to claim 17, wherein the mapping coefficients for each of the plurality of classes are generated responsive to original image data for learning.

20. A method for coding original image data, having a plurality of pixels, to generate coded image data, comprising:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is minimized.

21. A method for coding original image data, having a plurality of pixels, to generate coded image data, comprising:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is less than a prescribed threshold value.

22. A method for coding original image data, having a plurality of pixels, to generate coded image data, comprising:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping coefficients for each class are generated by steps of:

extracting a plurality of pixels of the original image data for learning and generating class information corresponding to characteristics of the extracted plurality of pixels;

producing coded data where a number of pixels of the original image data for learning is reduced, responsive to the original image data for learning and mapping coefficients that correspond to class information;

generating predicted image data for learning in accordance with the coded data and generating predicted data having a plurality of predicted pixels;

generating a predicted error of the predicted image data for learning relative to the original image data for learning;

updating the mapping coefficients in accordance with the generated predicted error until the updated mapping coefficients are optimum mapping coefficients; and determining the optimum mapping coefficients.

23. A method for coding original image data, having a plurality of pixels, to generate coded image data, comprising:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping for each class is determined by reducing a number of pixels of the original image data to generate compressed data;

correcting the compressed data to generate corrected data;

predicting the original image data in accordance with the corrected data and generating predicted data having a plurality of predicted pixels;

calculating, with respect to the original image data, a predicted error of the predicted data;

determining suitability of the corrected data as coded data based upon the predicted error;

repeating the correcting step until the corrected data is an optimum corrected data;

generating optimum mapping coefficients for each class using the original image data for learning and the optimum corrected data.

24. A method for decoding coded image data generated by coding original image data, comprising:

receiving the coded image data; and decoding the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes, wherein the mapping coefficients are generated based on a predicted error of predicted image data for learning, and an original image data for learning;

reading the mapping coefficients that correspond to the generated class information; and producing the coded image data responsive to the original image data and the read mapping coefficients.

25. A method according to claim 24, wherein the coded image data has fewer pixels than the original image data.

26. A method according to claim 25, wherein said decoding step includes storing predicted coefficients for each of the plurality of classes used to generate the mapping coefficients;

extracting a plurality of pixels of the coded image data and generating class information corresponding to the extracted plurality of pixels;

reading predicted coefficients corresponding to the generated class information; and producing the decoded image data using the coded image data and the read predicted coefficients.

27. A method according to claim 26, wherein the predicted coefficients for each class are generated using original image data for learning.

28. A method according to claim 25, wherein the mapping coefficients for each class are generated using original image data for learning.

29. A method for decoding coded image data generated by coding original image data, comprising:

receiving the coded image data; and decoding the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes:

reading the mapping coefficients that correspond to the generated class information; and producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is minimized.

30. A method for decoding coded image data generated by coding original image data, comprising:

receiving the coded image data; and decoding the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is less than a prescribed threshold value.

31. A method for transmitting image data, having a plurality of pixels, comprising:

extracting a plurality of pixels from original image data and generating class information corresponding to characteristics of the extracted plurality of pixels, wherein the generated class information indicates one of a plurality of classes;

storing mapping coefficients for each of the plurality of classes, wherein the mapping coefficients are generated based on a predicted error of predicted image data for learning, and an original image data for learning;

reading the mapping coefficients that correspond to the generated class information; and producing coded image data responsive to the original image data and the read mapping coefficients;

transmitting the coded image data.

32. A method according to claim 31, wherein said producing step produces the coded image data having fewer pixels than the original image data.

33. A method according to claim 32, wherein the mapping coefficients for each of the plurality of classes are generated responsive to original image data for learning.

34. A method according to claim 31, wherein said producing step includes:

extracting a plurality of pixels from the original image data; and producing the coded image data by performing calculations on a pixel value for pixels of a block and the read mapping coefficients.

35. A method for transmitting image data, having a plurality of pixels, comprising;

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients;

transmitting the coded image data, wherein the mapping coefficients for each class are generated such that a predicted error of predicted image data for learning, determined from a difference between decoding coded data generated from the original image data for learning, and the original image data for learning, is minimized.

36. A method for transmitting image data, having a plurality of pixels, comprising:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients;

transmitting the coded image data, wherein the mapping coefficients for each class are generated such that a predicted error of predicted image data for learning, determined from a difference between decoding coded data generated from the original image data for learning, and the original image data for learning, is less than a prescribed threshold value.

37. A method for transmitting image data, having a plurality of pixels, comprising:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients;

transmitting the coded image data, wherein the mapping coefficients for each class are generated by steps of:

extracting a plurality of pixels of the original image data for learning and generating class information corresponding to characteristics of the extracted plurality of pixels;

producing coded data where a number of pixels of the original image data for learning is reduced, responsive to the original image data for learning and mapping coefficients that correspond to class information;

generating predicted image data for learning in accordance with the coded data and generating predicted data having a plurality of predicted pixels;

generating a predicted error of the predicted image data for learning relative to the original image data for learning;

updating the mapping coefficients in accordance with the generated predicted error until the updated mapping coefficients are optimum mapping coefficients; and determining the optimum mapping coefficients.

38. A method for transmitting image data, having a plurality of pixels, comprising:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients;

transmitting the coded image data, wherein the mapping for each class is determined by reducing a number of pixels of the original image data to generate compressed data;

correcting the compressed data to generate corrected data;

predicting the original image data in accordance with the corrected data and generating predicted data having a plurality of predicted pixels;

calculating, with respect to the original image data, a predicted error of the predicted data;

determining suitability of the corrected data as coded data based upon the predicted error;

repeating the correcting step until the corrected data is an optimum corrected data;

generating optimum mapping coefficients for each class using the original image data for learning and the optimum corrected data.

39. An article of manufacture having recorded thereon coded image data, the article of manufacture produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes, wherein the mapping coefficients are generated based on a predicted error of predicted image data for learning, and an original image data for learning;

reading the mapping coefficients that correspond to the generated class information; and producing coded image data responsive to the original image data and the read mapping coefficients; and recording the coded image data.

40. An article of manufacture according to claim 39, wherein said producing step produces the coded image data having fewer pixels than the original image data.

41. An article of manufacture according to claim 39, wherein said producing step includes:

extracting a plurality of pixels from the original image data; and producing the coded image data by performing calculations on a pixel value for pixels of a block and the read mapping coefficients.

42. An article of manufacture according to claim 40, wherein the mapping coefficients for each of the plurality of classes are generated responsive to original image data for learning.

43. An article of manufacture having recorded thereon coded image data, the article of manufacture produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients; and recording the coded image data, wherein the mapping coefficients for each class are generated such that a predicted error of predicted image data for learning, determined from a difference between decoding coded data generated from the original image data for learning, and the original image data for learning, is minimized.

44. An article of manufacture having recorded thereon coded image data, the article of manufacture produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients; and recording the coded image data, wherein the mapping coefficients for each class are generated such that a predicted error of predicted image data for learning, determined from a difference between decoding coded data generated from the original image data for learning, and the original image data for learning, is less than a prescribed threshold value.

45. An article of manufacture having recorded thereon coded image data, the article of manufacture produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients; and recording the coded image data, wherein the mapping coefficients for each class are generated by steps of:

extracting a plurality of pixels of the original image data for learning and generating class information corresponding to characteristics of the extracted plurality of pixels;

producing coded data where a number of pixels of the original image data for learning is reduced, responsive to the original image data for learning and mapping coefficients that correspond to class information;

generating predicted image data for learning in accordance with the coded data and generating predicted data having a plurality of predicted pixels;

generating a predicted error of the predicted image data for learning relative to the original image data for learning;

updating the mapping coefficients in accordance with the generated predicted error until the updated mapping coefficients are optimum mapping coefficients; and determining the optimum mapping coefficients.

46. An article of manufacture having recorded thereon coded image data, the article of manufacture produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients; and recording the coded image data, wherein the mapping for each class is determined by reducing a number of pixels of the original image data to generate compressed data;

correcting the compressed data to generate corrected data;

predicting the original image data in accordance with the corrected data and generating predicted data having a plurality of predicted pixels;

calculating, with respect to the original image data, a predicted error of the predicted data;

determining suitability of the corrected data as coded data based upon the predicted error;

repeating the correcting step until the corrected data is an optimum corrected data;

generating optimum mapping coefficients for each class using the original image data for learning and the optimum corrected data.

47. A method of transmitting coded image data, comprising:

receiving the coded image data; and transmitting the coded image data, wherein the coded image data is produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes, wherein the mapping coefficients are generated based on a predicted error of predicted image data for learning, and an original image data for learning;

reading the mapping coefficients that correspond to the generated class information; and producing coded image data responsive to the original image data and the read mapping coefficients; and recording the coded image data.

48. A method according to claim 47, wherein said producing step produces the coded image data having fewer pixels than the original image data.

49. A method according to claim 48, wherein the mapping coefficients for each of the plurality of classes are generated responsive to original image data for learning.

50. A method according to claim 47, wherein said producing step includes:

extracting a plurality of pixels from the original image data; and producing the coded image data by performing calculations on a pixel value for pixels of a block and the read mapping coefficients.

51. A method of transmitting coded image data, comprising:

receiving the coded image data; and transmitting the coded image data, wherein the coded image data is produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients; and recording the coded image data, wherein the mapping coefficients for each class are generated such that a predicted error of predicted image data for learning, determined from a difference between decoding coded data generated from the original image data for learning, and the original image data for learning, is minimized.

52. A method of transmitting coded image data, comprising:

receiving the coded image data; and transmitting the coded image data, wherein the coded image data is produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients; and recording the coded image data, wherein the mapping coefficients for each class are generated such that a predicted error of predicted image data for learning, determined from a difference between decoding coded data generated from the original image data for learning, and the original image data for learning, is less than a prescribed threshold value.

53. A method of transmitting coded image data, comprising:

receiving the coded image data; and transmitting the coded image data, wherein the coded image data is produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients; and recording the coded image data, wherein the mapping coefficients for each class are generated by steps of:

extracting a plurality of pixels of the original image data for learning and generating class information corresponding to characteristics of the extracted plurality of pixels;

producing coded data where a number of pixels of the original image data for learning is reduced, responsive to the original image data for learning and mapping coefficients that correspond to class information;

generating predicted image data for learning in accordance with the coded data and generating predicted data having a plurality of predicted pixels;

generating a predicted error of the predicted image data for learning relative to the original image data for learning;

updating the mapping coefficients in accordance with the generated predicted error until the updated mapping coefficients are optimum mapping coefficients; and determining the optimum mapping coefficients.

54. A method of transmitting coded image data, comprising:

receiving the coded image data; and transmitting the coded image data, wherein the coded image data is produced by the following steps of:

extracting a plurality of pixels from original image data and generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing coded image data responsive to the original image data and the read mapping coefficients; and recording the coded image data, wherein the mapping for each class is determined by reducing a number of pixels of the original image data to generate compressed data;

correcting the compressed data to generate corrected data;

predicting the original image data in accordance with the corrected data and generating predicted data having a plurality of predicted pixels;

calculating, with respect to the original image data, a predicted error of the predicted data;

determining suitability of the corrected data as coded data based upon the predicted error;

repeating the correcting step until the corrected data is an optimum corrected data;

generating optimum mapping coefficients for each class using the original image data for learning and the optimum corrected data.

55. An apparatus for coding original image data, having a plurality of pixels, to generate coded image data, comprising:

an extracting circuit that extracts a plurality of pixels from the original image data and for generating class information corresponding to characteristics of the extracted plurality of pixels, wherein the generated class information indicates one of a plurality of classes;

a storing circuit that stores mapping coefficients for each of the plurality of classes, wherein the mapping coefficients are generated based on a predicted error of predicted image data for learning, and an original image data for learning;

a reading circuit that reads the mapping coefficients that correspond to the generated class information; and a coding circuit that produces the coded image data responsive to the original image data and the read mapping coefficients.

56. An apparatus according to claim 55, wherein said coding circuit produces the coded image data having fewer pixels than the original image data.

57. An apparatus according to claim 56, wherein the mapping coefficients for each of the plurality of classes are generated responsive to original image data for learning.

58. An apparatus according to claim 55, wherein said coding circuit includes:

an extracting circuit that extracts a plurality of pixels from the original image data; and coding circuit that produces the coded image data by performing calculations on a pixel value for pixels of a block and the read mapping coefficients.

59. An apparatus for coding original image data, having a plurality of pixels, to generate coded image data, comprising:

an extracting circuit that extracts a plurality of pixels from the original image data and for generating class information corresponding to characteristics of the extracted plurality of pixels, wherein the generated class information indicates one of a plurality of classes;

a storing circuit that stores mapping coefficients for each of the plurality of classes;

a reading circuit that reads the mapping coefficients that correspond to the generated class information; and a coding circuit that produces the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is minimized.

60. An apparatus for coding original image data, having a plurality of pixels, to generate coded image data, comprising:

an extracting circuit that extracts a plurality of pixels from the original image data and for generating class information corresponding to characteristics of the extracted plurality of pixels, wherein the generated class information indicates one of a plurality of classes;

a storing circuit that stores mapping coefficients for each of the plurality of classes;

a reading circuit that reads the mapping coefficients that correspond to the generated class information; and a coding circuit that produces the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is less than a prescribed threshold value.

61. An apparatus for coding original image data, having a plurality of pixels, to generate coded image data, comprising:

an extracting circuit that extracts a plurality of pixels from the original image data and for generating class information corresponding to characteristics of the extracted plurality of pixels, wherein the generated class information indicates one of a plurality of classes;

a storing circuit that stores mapping coefficients for each of the plurality of classes;

a reading circuit that reads the mapping coefficients that correspond to the generated class information; and a coding circuit that produces the coded image data responsive to the original image data and the read mapping coefficients, wherein the mapping coefficients for each class are generated by steps of:

extracting a plurality of pixels of the original image data for learning and generating class information corresponding to characteristics of the extracted plurality of pixels;

producing coded data where a number of pixels of the original image data for learning is reduced, responsive to the original image data for learning and mapping coefficients that correspond to class information;

generating predicted image data for learning in accordance with the coded data and generating predicted data having a plurality of predicted pixels;

generating a predicted error of the predicted image data for learning relative to the original image data for learning;

updating the mapping coefficients in accordance with the generated predicted error until the updated mapping coefficients are optimum mapping coefficients; and determining the optimum mapping coefficients.

62. An apparatus for coding original image data, having a plurality of pixels, to generate coded image data, comprising:

an extracting circuit that extracts a plurality of pixels from the original image data and for generating class information corresponding to characteristics of the extracted plurality of pixels, wherein the generated class information indicates one of a plurality of classes;

a storing circuit that stores mapping coefficients for each of the plurality of classes;

a reading circuit that reads the mapping coefficients that correspond to the generated class information; and a coding circuit that produces the coded image data responsive to the original image data and the read mapping coefficients, wherein the mapping for each class is determined by reducing a number of pixels of the original image data to generate compressed data;

correcting the compressed data to generate corrected data;

predicting the original image data in accordance with the corrected data and generating predicted data having a plurality of predicted pixels;

calculating, with respect to the original image data, a predicted error of the predicted data;

determining suitability of the corrected data as coded data based upon the predicted error;

repeating the correcting step until the corrected data is an optimum corrected data;

generating optimum mapping coefficients for each class using the original image data for learning and the optimum corrected data.

63. An apparatus for decoding coded image data generated by coding original image data, comprising:

a receiving circuit that receives the coded image data; and a decoding circuit that decodes the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes, wherein the mapping coefficients are generated based on a predicted error of predicted image data for learning, and an original image data for learning;

reading the mapping coefficients that correspond to the generated class information; and producing the coded image data responsive to the original image data and the read mapping coefficients.

64. An apparatus according to claim 63, wherein the coded image data has fewer pixels than the original image data.

65. An apparatus according to claim 64, wherein said decoding circuit includes memory for storing predicted coefficients for each of the plurality of classes used to generate the mapping coefficients;

an extracting circuit that extracts a plurality of pixels of the coded image data and generating class information corresponding to the extracted plurality of pixels;

a reading circuit that reads predicted coefficients corresponding to the generated class information; and a coding circuit that produces the decoded image data using the coded image data and the read predicted coefficients.

66. An apparatus according to claim 65, wherein the predicted coefficients for each class are generated using original image data for learning.

67. An apparatus according to claim 64, wherein the mapping coefficients for each class are generated using original image data for learning.

68. An apparatus for decoding coded image data generated by coding original image data, comprising:

a receiving circuit that receives the coded image data; and a decoding circuit that decodes the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is minimized.

69. An apparatus for decoding coded image data generated by coding original image data, comprising:

a receiving circuit that receives the coded image data; and a decoding circuit that decodes the coded image data and producing decoded image data, wherein said coded image data is generated by the steps of:

extracting a plurality of pixels from the original image data and for generating class information corresponding to characteristics of the extracted plurality of pixels, wherein the generated class information indicates one of a plurality of classes;

storing mapping coefficients for each of the plurality of classes;

reading the mapping coefficients that correspond to the generated class information; and producing the coded image data responsive to the original image data and the read mapping coefficients, wherein the mapping coefficients for each class are generated such that a predicted error of predicted image data for learning, determined from a difference between decoding coded data generated from the original image data for learning, and the original image data for learning, is less than a prescribed threshold value.

* * * * *